(12) United States Patent
Zhang et al.

(10) Patent No.: US 12,450,213 B2
(45) Date of Patent: Oct. 21, 2025

(54) DATABASE SYSTEM UPDATE METHOD AND RELATED APPARATUS

(71) Applicant: HUAWEI TECHNOLOGIES CO., LTD., Guangdong (CN)

(72) Inventors: Qiong Zhang, Shanghai (CN); Wei Cheng, Shenzhen (CN); Biao Wang, Xi'an (CN); Hanchen Zhou, Shenzhen (CN); Xuli Li, Shenzhen (CN); Lening Chen, Shenzhen (CN); Lin Li, Shenzhen (CN); Chao Ma, Xi'an (CN); Yihao Song, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/756,014

(22) Filed: Jun. 27, 2024

(65) Prior Publication Data
US 2024/0345999 A1    Oct. 17, 2024

Related U.S. Application Data

(63) Continuation of application No. PCT/CN2022/141404, filed on Dec. 23, 2022.

(30) Foreign Application Priority Data

Dec. 31, 2021    (CN) .......................... 202111676099.3

(51) Int. Cl.
    *G06F 16/21*    (2019.01)
    *G06F 16/23*    (2019.01)
    *G06F 16/27*    (2019.01)

(52) U.S. Cl.
    CPC ........ *G06F 16/214* (2019.01); *G06F 16/2379* (2019.01); *G06F 16/278* (2019.01)

(58) Field of Classification Search
    CPC .. G06F 16/214; G06F 16/2379; G06F 16/278; G06F 16/176; G06F 16/21; G06F 16/2358; G06F 16/27; G06F 16/23
    See application file for complete search history.

(56) References Cited

U.S. PATENT DOCUMENTS

| | | | |
|---|---|---|---|
| 11,762,850 B2* | 9/2023 | Rupprecht | .......... H04L 67/1097 |
| | | | 707/769 |
| 2015/0134626 A1* | 5/2015 | Theimer | ............. G06F 11/3055 |
| | | | 707/693 |

(Continued)

OTHER PUBLICATIONS

EPO Search Report for application EP4432114 (Year: 2025).*

(Continued)

*Primary Examiner* — William Spieler
(74) *Attorney, Agent, or Firm* — WOMBLE BOND DICKINSON (US) LLP

(57) ABSTRACT

This application discloses a database system update method, applied to a database including a first node, a second node, and a shared storage device. The method includes: The first node sends a first instruction to the second node, where the first instruction is used to request storage location information of first data in the shared storage device, and the first data is data transferred by the second node to the first node for processing; and the first node obtains first information sent by the second node, and obtains mapping information from the shared storage device based on the first information, where the mapping information indicates a storage location of the first data in the shared storage device. The method is used to improve update efficiency of the database system, and ensure that different nodes can simultaneously process different data in a shared storage device.

20 Claims, 12 Drawing Sheets

(56) References Cited

U.S. PATENT DOCUMENTS

2018/0373708 A1    12/2018  Martin et al.
2019/0014060 A1*   1/2019   Mordani ............... H04L 47/827

OTHER PUBLICATIONS

Pedro Pedreira et al:"Interactive Analytic DBMSs: Breaching the Scalability Wall." Apr. 2021. XP033930232, total 12 pages.
Alexandre Verbitski et al.Amazon Aurora: Design Considerations for High Throughput Cloud-Native Relational Databases Mar. 29, 2017 total 12 pages.
Dongxu Huang et al.TiDB: A Raft-based HTAP Database Aug. 12, 2020 total 13 pages.

* cited by examiner

Phase 2: Incremental log synchronization of a system mapping table

Phase 3: Partition mapping table synchronization

Phase 4: Incremental data synchronization of a partition mapping table

Process 1: Mapping table baseline data migration

Process 2: Mapping table incremental data migration

DATABASE SYSTEM UPDATE METHOD AND RELATED APPARATUS

CROSS-REFERENCE TO RELATED APPLICATIONS

This application is a continuation of International Application No. PCT/CN2022/141404, filed on Dec. 23, 2022, which claims priority to Chinese Patent Application No. 202111676099.3, filed on Dec. 31, 2021. The disclosures of the aforementioned applications are hereby incorporated by reference in their entireties.

TECHNICAL FIELD

This application relates to the field of database technologies, and in particular, to a database system update method and a related apparatus.

BACKGROUND

With rapid development of information technologies, for a database, a data amount and an access amount increase rapidly. Generally, as the data amount in the database continuously increases, the access amount of the database also increases rapidly, and a requirement for access efficiency is higher. When the access amount of the database keeps increasing, a computing resource of the database needs to be scaled-out to improve the access efficiency of the database.

Currently, a database system used to implement a database function is usually a distributed database system. The distributed database system includes a plurality of groups of subsystems, and different subsystems are respectively responsible for processing different data. In the plurality of groups of subsystems, each group of subsystems includes a computing node and a storage node. The storage node is configured to store data in the database, and the computing node is configured to process data of a storage node in a same subsystem as the computing node based on a data processing request. Based on the distributed database system, different computing nodes can simultaneously process different data, thereby improving access efficiency of the database, and effectively avoiding that the different computing nodes simultaneously process same data.

In a process of scaling out the computing resource of the database, a subsystem including a computing node and a storage node usually needs to be added. Then, some data on a storage node in an original subsystem is migrated to a newly added storage node, and a newly added computing node is responsible for processing the migrated data, thereby reducing data processing pressure of an original computing node and implementing load balancing between the computing nodes.

It is clear that in an existing method for scaling out the computing resource of the database, a large amount of data usually needs to be migrated between nodes, and data migration time is long, resulting in low scale-out efficiency of the database.

SUMMARY

This application provides a database system update method, to improve update efficiency of a database system, and ensure that different nodes can simultaneously process different data in a shared storage device.

This application provides a database system update method, applied to a database system including a first node, a second node, and a shared storage device. The shared storage device is configured to store data, and the first node and the second node are respectively configured to process different data in the shared storage device. The method includes: The first node sends a first instruction to the second node, where the first instruction is used to request storage location information of first data in the shared storage device, and the first data is data transferred by the second node to the first node for processing. The first node obtains first information sent by the second node, where the first information indicates mapping information stored in the shared storage device, and the mapping information indicates a storage location of the first data in the shared storage device.

The first node obtains the mapping information from the shared storage device based on the first information.

The first node processes the first data in the shared storage device based on the mapping information.

In this solution, a plurality of data processing nodes in the database system share a same storage device, and the plurality of data processing nodes are respectively configured to process different data in the shared storage device. When a computing resource of the database system is updated, data that is responsibly processed by the second node needs to be transferred to the first node for processing, and the second node sends indication information to the first node, so that the first node obtains, from the shared storage device, the mapping information that records the data storage location, and processes, based on the obtained mapping information, some data that is in the shared storage device and that is transferred to the first node for processing. Different nodes share a same storage device, and the different nodes process different data based on corresponding mapping information. When the computing resource of the database system is updated, a large amount of data does not need to be migrated between nodes, but only the mapping information used to record the data storage location is migrated, so as to improve update efficiency of the database system, and ensure that the different nodes can simultaneously process the different data in the shared storage device.

In an embodiment, when the database system is scaled-out, the first node is a newly added node in a database, and the second node is an original node in the database. To ensure load balancing between nodes in the database system, the second node transfers some data for which the second node is responsible to the first node for responsibility.

In this solution, when the database system is scaled-out, the database system can be scaled-out by migrating only the mapping information that records the data storage location to the newly added node, thereby avoiding migration of the large amount of data and improving scale-out efficiency of the database system.

In an embodiment, when the database is scaled-in, both the first node and the second node are original data processing nodes in the database, and the second node is a to-be-deleted node in the database. The second node needs to transfer the data responsibly processed by the second node to another node in the database system for processing.

In this solution, when the database system is scaled-in, the database system can be scaled-in by migrating only mapping information that records a data storage location for which the to-be-deleted node is responsible to the another node, thereby avoiding migration of the large amount of data and improving scale-in efficiency of the database system.

In an embodiment, the shared storage device includes a plurality of slices, the plurality of slices are respectively used to store different data, the mapping information includes a first mapping table and a second mapping table, the first mapping table indicates a target slice in which the first data is stored in the shared storage device, and the second mapping table indicates a storage location of the first data in the target slice.

In this solution, based on a multi-slice design for the shared storage device, the mapping information that records the data storage location is divided into the first mapping table and the second mapping table. The first mapping table indicates the slice in which the data is located, and the second mapping table indicates the storage location of the data in the slice, so that a node can quickly find the storage location in which the data is located, thereby improving data processing efficiency of the node.

In an embodiment, the method further includes: The first node obtains an incremental log from the shared storage device, where the incremental log is generated by the second node in a period in which the first node obtains the mapping information, and the incremental log is used to record data update information in the shared storage device. The first node updates the mapping information based on the incremental log.

In this solution, because a specification of the mapping information in the shared storage device is large, time required by the first node to synchronize the mapping information to a first zone is usually long. In a process of synchronizing the mapping information by the first node, the second node executes a database service at the same time. After completing synchronization of the mapping information, the first node suspends the database service, and the first node obtains information about updating of the mapping information by the second node during synchronization of the mapping information. This can effectively avoid that the database service is suspended for a long time in the process of synchronizing the mapping information by the first node, thereby shortening duration of affecting the database service.

In an embodiment, the method further includes: The first node stores the mapping information in the first zone in the shared storage device, where the first zone is a zone that is in the shared storage device and that is used to store data related to the first node. The first node generates second information based on the first zone, where the second information indicates a storage location of the mapping information.

In this solution, the first mapping table is stored in the shared storage device, and the first node records a storage location of the first mapping table in the shared storage device, so that a storage resource of the first node can be saved.

In an embodiment, after the first node obtains the mapping information from the shared storage device based on the first information, the method further includes: The first node sends a second instruction to the second node, where the second instruction instructs the second node to delete mapping information related to the first data from the second node.

In this solution, after successfully obtaining the mapping information, the first node deletes the mapping information through the second node, to ensure that only the first node is responsible for processing the first data in the shared storage device subsequently, thereby avoiding that a plurality of nodes simultaneously process same data.

A second aspect of this application provides a database system update method, applied to a database including a first node, a second node, and a shared storage device. The shared storage device is configured to store data, and the first node and the second node are respectively configured to process different data in the shared storage device. The method includes: The second node obtains a first instruction sent by the first node, where the first instruction is used to request storage location information of first data in the shared storage device, and the first data is data transferred by the second node to the first node for processing. The second node generates first information based on the first instruction and mapping information in the shared storage device, where the first information indicates the mapping information stored in the shared storage device, and the mapping information indicates a storage location of the first data in the shared storage device. The second node sends the first information to the first node, so that the second node obtains the mapping information.

In an embodiment, the first node is a newly added node in the database system.

In an embodiment, the second node is a to-be-deleted node in the database system.

In an embodiment, the shared storage device includes a plurality of slices, the plurality of slices are respectively used to store different data, the mapping information includes a first mapping table and a second mapping table, the first mapping table indicates a target slice in which the first data is stored in the shared storage device, and the second mapping table indicates a storage location of the first data in the target slice.

In an embodiment, the method further includes: The second node generates an incremental log based on a data processing request, and stores the incremental log in the shared storage device, where the data processing request is used to request to update the first data, and the incremental log is used to record update information of the first data.

In an embodiment, the shared storage device includes the plurality of slices, the plurality of slices are respectively used to store the different data, the incremental log includes a plurality of pieces of log data, and the plurality of pieces of log data are respectively used to record data update information on different slices.

In an embodiment, the method further includes: The second node receives a second instruction sent by the first node, where the second instruction instructs the second node to delete mapping information related to the first data from the second node. The second node deletes the mapping information related to the first data in the second node based on the second instruction.

A third aspect of this application provides a server, and the server is a first node in a database system. The database system includes a first node, a second node, and a shared storage device. The shared storage device is configured to store data. The first node and the second node are respectively configured to process different data in the shared storage device. The server includes: a sending unit, configured to send a first instruction to the second node, where the first instruction is used to request storage location information of first data in the shared storage device, and the first data is data transferred by the second node to the first node for processing; a receiving unit, configured to obtain first information sent by the second node, where the first information indicates mapping information stored in the shared storage device, and the mapping information indicates a storage location of the first data in the shared storage device; and a processing unit, configured to obtain the mapping information from the shared storage device based on the first information. The processing unit is further configured to process the first data in the shared storage device based on the mapping information.

In an embodiment, the first node is a newly added node in the database system.

In an embodiment, the second node is a to-be-deleted node in the database system.

In an embodiment, the shared storage device includes a plurality of slices, the plurality of slices are respectively used to store different data, the mapping information includes a first mapping table and a second mapping table, the first mapping table indicates a target slice in which the first data is stored in the shared storage device, and the second mapping table indicates a storage location of the first data in the target slice.

In an embodiment, the processing unit is further configured to: obtain an incremental log from the shared storage device, where the incremental log is generated by the second node in a period in which the first node obtains the mapping information, and the incremental log is used to record data update information in the shared storage device; and update the mapping information based on the incremental log.

In an embodiment, the shared storage device includes the plurality of slices, the plurality of slices are respectively used to store the different data, the incremental log includes a plurality of pieces of log data, and the plurality of pieces of log data are respectively used to record data update information on different slices.

In an embodiment, the processing unit is further configured to: store the mapping information in a first zone in the shared storage device, where the first zone is a zone that is in the shared storage device and that is used to store data related to the first node; and generate second information based on the first zone, where the second information indicates a storage location of the mapping information.

In an embodiment, the sending unit is further configured to send a second instruction to the second node, where the second instruction instructs the second node to delete mapping information related to the first data from the second node.

A fourth aspect of this application provides a server, and the server is a second node in a database system. The database system includes a first node, a second node, and a shared storage device. The shared storage device is configured to store data. The first node and the second node are respectively configured to process different data in the shared storage device. The server includes: a receiving unit, configured to obtain a first instruction sent by the first node, where the first instruction is used to request storage location information of first data in the shared storage device, and the first data is data transferred by the second node to the first node for processing; a processing unit, configured to generate first information based on the first instruction and mapping information in the shared storage device, where the first information indicates the mapping information stored in the shared storage device, and the mapping information indicates a storage location of the first data in the shared storage device; and a sending unit, configured to send the first information to the first node, so that the second node obtains the mapping information.

In an embodiment, the first node is a newly added node in the database system.

In an embodiment, the second node is a to-be-deleted node in the database system.

In an embodiment, the shared storage device includes a plurality of slices, the plurality of slices are respectively used to store different data, the mapping information includes a first mapping table and a second mapping table, the first mapping table indicates a target slice in which the first data is stored in the shared storage device, and the second mapping table indicates a storage location of the first data in the target slice.

In an embodiment, the processing unit is further configured to: generate an incremental log based on a data processing request, and store the incremental log in the shared storage device, where the data processing request is used to request to update the first data, and the incremental log is used to record update information of the first data.

In an embodiment, the shared storage device includes the plurality of slices, the plurality of slices are respectively used to store the different data, the incremental log includes a plurality of pieces of log data, and the plurality of pieces of log data are respectively used to record data update information on different slices.

In an embodiment, the receiving unit is further configured to receive a second instruction sent by the first node, where the second instruction instructs the second node to delete mapping information related to the first data from the second node; and the processing unit is further configured to delete the mapping information related to the first data in the second node based on the second instruction.

A fifth aspect of this application provides a database system, including the server in any one of the third aspect or the implementations of the third aspect, the server in any one of the fourth aspect or the implementations of the fourth aspect, and a shared storage device.

A sixth aspect of this application provides a computer-readable storage medium. The computer-readable storage medium stores a computer program, and when the computer program is run on a computer, the computer performs the method in the first aspect or the second aspect.

A seventh aspect of this application provides a computer program product. When the computer program product runs on a computer, the computer performs the method in the first aspect or the second aspect.

DESCRIPTION OF EMBODIMENTS

Figure 1:
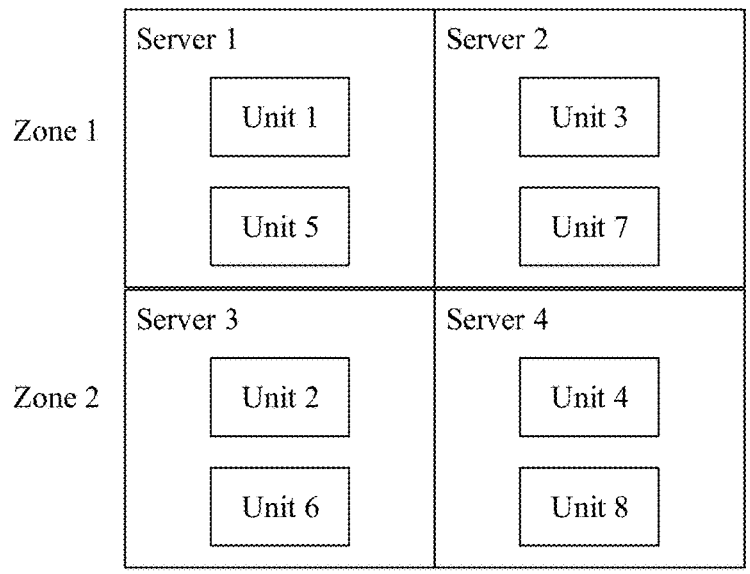
FIG. 1 is a diagram of an architecture of a database in a related technology.

The following describes embodiments of this application with reference to the accompanying drawings. One of ordinary skilled in the art may learn that, with development of technologies and emergence of a new scenario, the technical solutions provided in embodiments of this application are also applicable to a similar technical problem.

In the specification, claims, and accompanying drawings of this application, the terms "first", "second", and so on are intended to distinguish between similar objects but do not necessarily indicate an order or sequence. It should be understood that the terms used in such a way are interchangeable in proper circumstances, which is merely a discrimination manner that is used when objects having a same property are described in embodiments of this application. In addition, the terms "include", "have" and any other variants mean to cover the non-exclusive inclusion, so that a process, method, system, product, or device that includes a series of units is not necessarily limited to those units, but may include other units not expressly listed or inherent to such a process, method, product, or device.

For ease of understanding, the following first describes technical terms in embodiments of this application.

Metadata: is a type of data used to describe data. The metadata is mainly used to describe data property information and assist data retrieval.

Baseline data: is a data version based on a time point.

Incremental data: is a new data version generated based on a baseline data, that is, a new data version generated by adding, deleting, modifying the baseline data.

Checkpoint: is a mechanism similar to a bookmark. After the checkpoint is performed, all previous logs are deleted from a system and permanently stored in a storage disk.

Primary copy: is a data copy that can be read and written.

Standby copy: is a data copy that cannot be written.

Structured query language (SQL): is a database query and programming language, and is used to access data and query, update, and manage a relational database system. In short, the SQL is a standard language for a client to operate data in a database.

Coordinator node (CN): is a client access entry, is responsible for delivering an SQL and another command to a data processing node, and stores a correspondence indicating that which data processing node is responsible for computing each table of the database.

Control coordinator node (CCN): includes a function of a CN and is responsible for load balancing between data processing nodes.

Data node (DN): is a data processing node in an embodiment, and is responsible for processing an SQL command delivered by a CN.

Data definition language (DDL): is a command that is in SQL commands and that is for creating and deleting a database, a table, and the like.

Storage abstraction layer (SAL): includes metadata but does not include data, and is responsible for computing a command, and the like.

Data function virtualization (DFV): has a function of computing and storage separation.

XLog: records transaction log information for log playback, that is, for rollback recovery, archiving, and the like.

Common log processor (CLP): provides an XLog-related abstract function.

PLog: is distributed storage that is provided by DFV and that supports only append write.

ULog: provides log-based storage abstraction with an unlimited length, is built on an PLog interface and PLog abstraction that are provided by DFV, and uses DFV PLog to implement a Log storage abstraction layer with an unlimited size.

FIG. 1 is a diagram of an architecture of a database system in a related technology. As shown in FIG. 1, a zone (Zone) is a logical concept. One region usually includes one or more zones, and each zone includes one or more servers. As shown in FIG. 1, a zone 1 includes a server 1 and a server 2, and a zone 2 includes a server 3 and a server 4.

A unit (Unit) is a resource division unit. A resource, for example, a central processing unit (CPU) resource and an input/output (I/O) resource on each server is divided by unit, and is migrated by unit during scale-out.

A slice is a data division unit. Data in a table of a database is divided into a plurality of slices, and each unit includes a plurality of slices. Each slice is distributed on a plurality of units, with one primary and two standbys.

Figure 2:
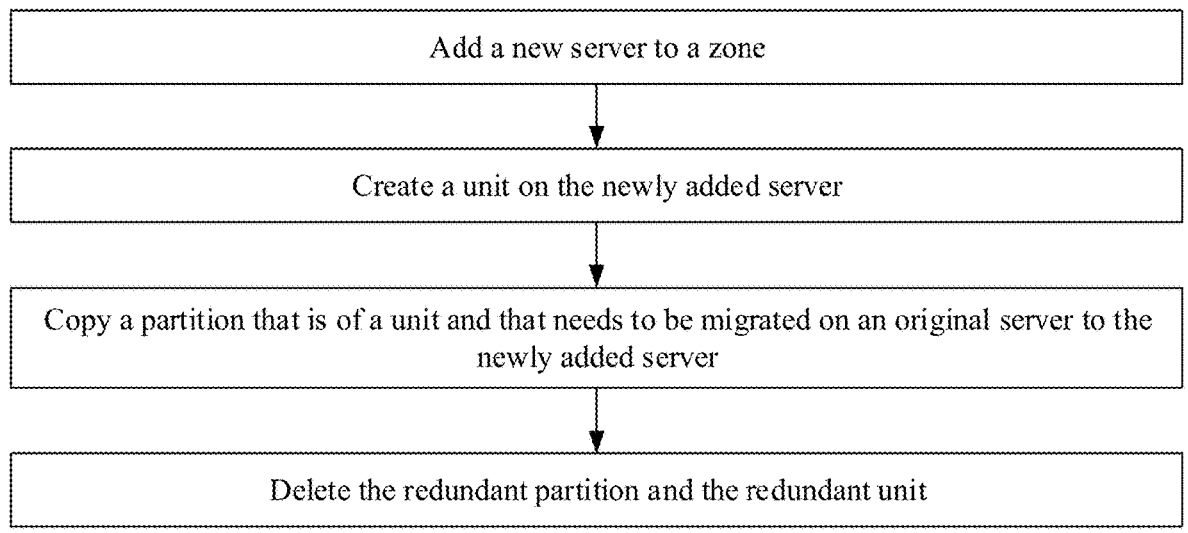
FIG. 2 is a schematic flowchart of database scale-out in a related technology.

FIG. 2 is a schematic flowchart of scaling out a computing resource of a database system in a related technology. As shown in FIG. 2, in a process of scaling out the computing resource of the database system, a new server is first added to an existing zone, and a unit used to store data is created on the server that is newly added to the zone. Then, a slice that is of a unit and that needs to be migrated on an original server is copied to the newly added server in a network transmission manner, to implement data migration. Finally, the redundant slice and the redundant unit are deleted, that is, the migrated unit and the migrated slice on the original server are deleted, to scale out the computing resource of the database system.

It can be learned from FIG. 1 and FIG. 2 that, to enable different servers to simultaneously process different data in the database, when the database is scaled-out, the computing resource and a storage resource need to be scaled-out together, and a large amount of data needs to be migrated between servers during scale-out. As a result, scale-out time is long, and a large quantity of network resources and I/O resources need to be consumed. In addition, in a process of migrating the data between the servers, a database service usually needs to be interrupted. Therefore, the database service is affected for a long time, and normal running of the service is easily affected.

In view of this, an embodiment provides a database system update method, to improve update efficiency of a database system, and ensure that different nodes in the database system can simultaneously process different data in the database.

For ease of understanding this solution, an architecture of the database provided in this application is first described with reference to FIG. 3 in an embodiment of the application.

Figure 3:
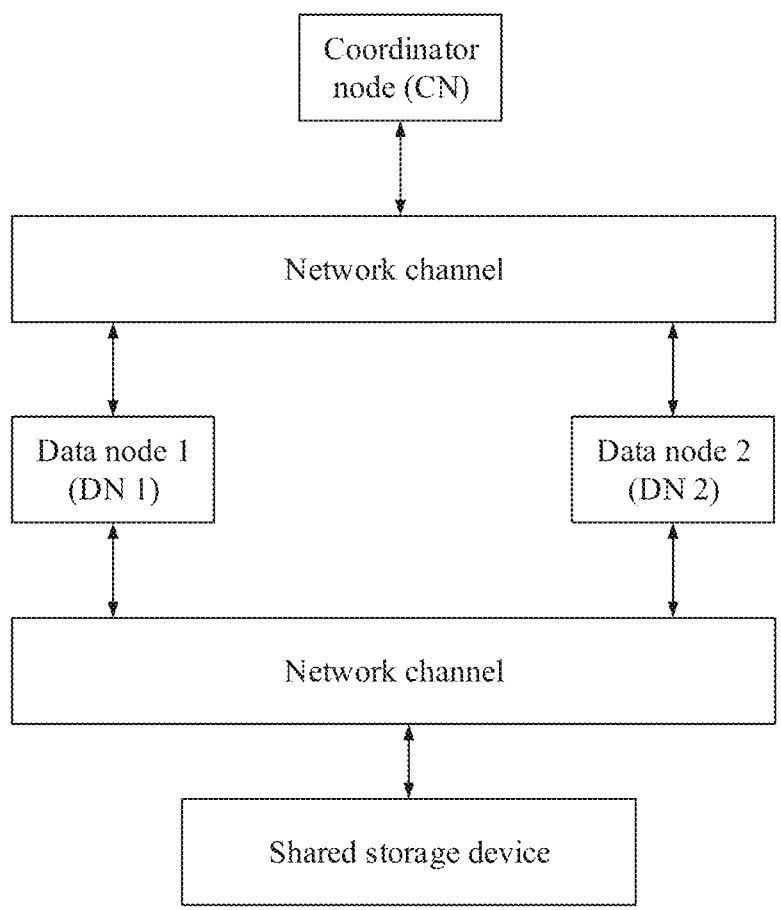
FIG. 3 is a diagram of an architecture of a database according to an embodiment of this application.

FIG. 3 is a diagram of an architecture of a database according to an embodiment of this application. As shown in FIG. 3, the database system includes a plurality of data processing nodes (for example, a data processing node 1 and a data processing node 2 in FIG. 3) and a shared storage device. The plurality of data processing nodes in the database system are separately connected to the shared storage device through a network channel, and the plurality of data processing nodes are all configured to receive data processing requests and process data in the shared storage device based on the data processing requests. For example, when the data processing requests are data read requests, the plurality of data processing nodes read data in storage locations in the shared storage device based on the data read requests; or when the data processing requests are data write requests, the plurality of data processing nodes write data into storage locations in the shared storage device based on the data write requests, to write or update the data.

In an embodiment, the database system may further include a coordinator node, and the coordinator node is connected to the plurality of data processing nodes through a network channel. The coordinator node is a client access entry, is responsible for delivering an SQL and another command to the data processing node, and stores a correspondence indicating that which data processing node is responsible for computing each table of the database. In short, different data processing nodes are responsible for processing different storage areas in the shared storage device, and the coordinator node stores the storage areas for which all the data processing nodes are responsible for processing. When a client initiates a data processing request, the coordinator node delivers the data processing request to a corresponding data processing node based on a storage area in which data requested to be processed by the data processing request is located, to process the corresponding data processing request.

In an embodiment, the data processing node in the database system may be, for example, a server.

Figure 4:
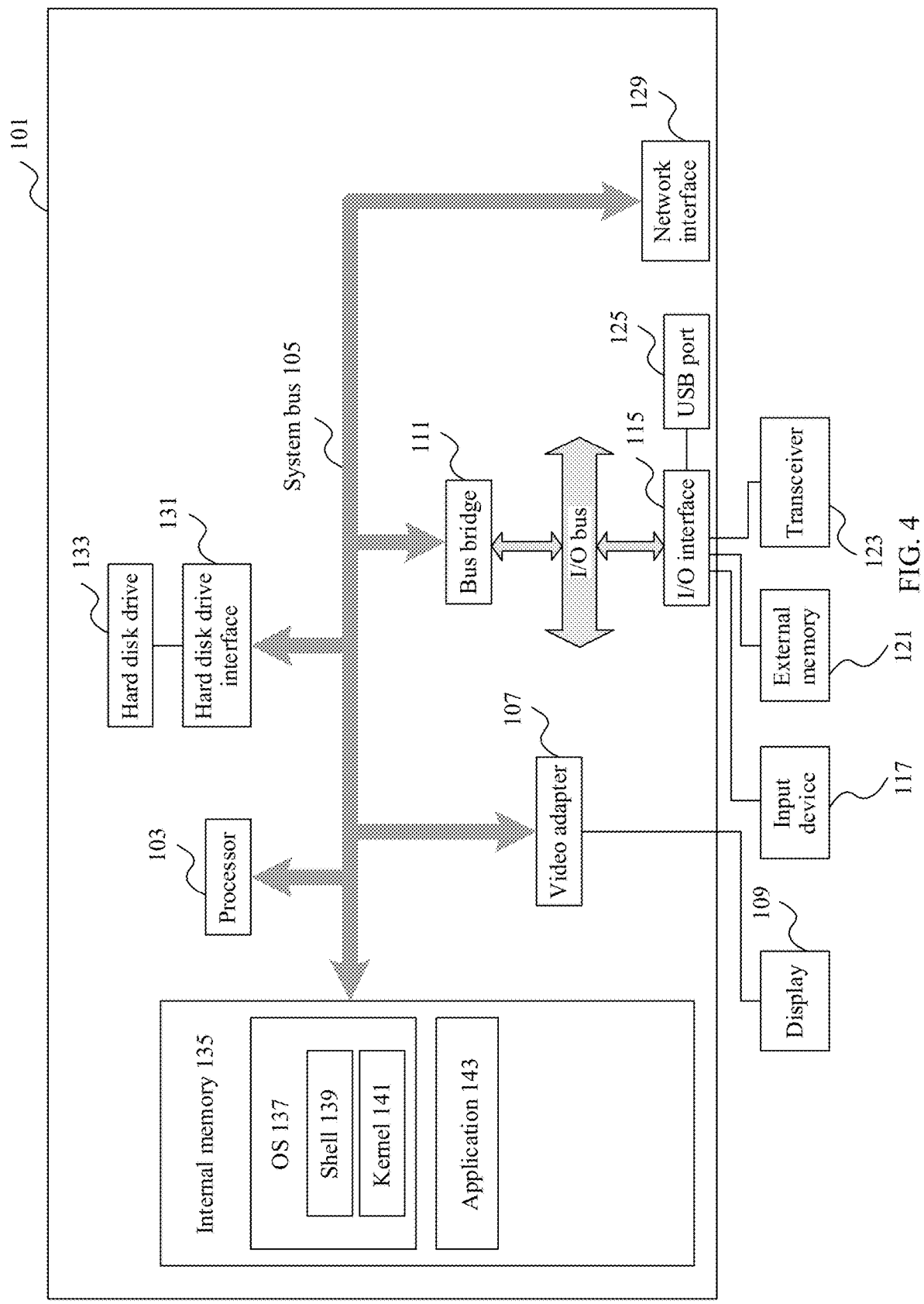
FIG. 4 is a diagram of a structure of a server 101 according to an embodiment of this application.

FIG. 4 is a diagram of a structure of a server 101 according to an embodiment of this application. As shown in FIG. 4, the server 101 includes a processor 103, and the processor 103 is coupled to a system bus 105. The processor 103 may be one or more processors, and each processor may include one or more processor cores. A video adapter 107 is further included, and the video adapter may drive a display 109, and the display 109 is coupled to the system bus 105. The system bus 105 is coupled to an input/output (I/O) bus through a bus bridge 111. An I/O interface 115 is coupled to the I/O bus. The I/O interface 115 communicates with a plurality of I/O devices, for example, an input device 117 (for example, a touchscreen), an external memory 121 (for example, a hard disk, a floppy disk, an optical disc, a USB disk, or a multimedia interface), a transceiver 123 (which may send and/or receive a radio communication signal), and an external USB port 125. In an embodiment, an interface connected to the I/O interface 115 may be a USB interface.

The processor 103 may be any conventional processor, including a reduced instruction set computing (RISC) processor, a complex instruction set computing (CISC) processor, or a combination thereof. In an embodiment, the processor may be a dedicated apparatus such as an ASIC.

A hard disk drive interface 131 is coupled to the system bus 105. A hardware drive interface is connected to the hard disk drive 133. An internal memory 135 is coupled to the system bus 105. Data running in the internal memory 135 may include an operating system (OS) 137, an application 143, and a scheduling table of the server 101.

The processor 103 may communicate with the internal memory 135 through the system bus 105, and extract instructions and data in the application 143 from the internal memory 135, to execute the program.

The operating system includes a shell 139 and a kernel 141. The shell 139 is an interface between a user and the kernel of the operating system. The shell is an outermost layer of the operating system. The shell manages interaction between the user and the operating system: waiting for an input from the user, interpreting the input from the user to the operating system, and processing various output results of the operating system.

The kernel 141 includes those parts of the operating system that are used for managing memories, files, peripherals, and system resources. The kernel 141 directly interacts with hardware, the kernel of the operating system usually runs a process, provides inter-process communication, and provides functions such as CPU time slice management, interrupt, memory management, and I/O management.

The foregoing describes the device to which embodiments of this application are applied. The following describes in detail a data processing method provided in embodiments of this application.

Figure 5:
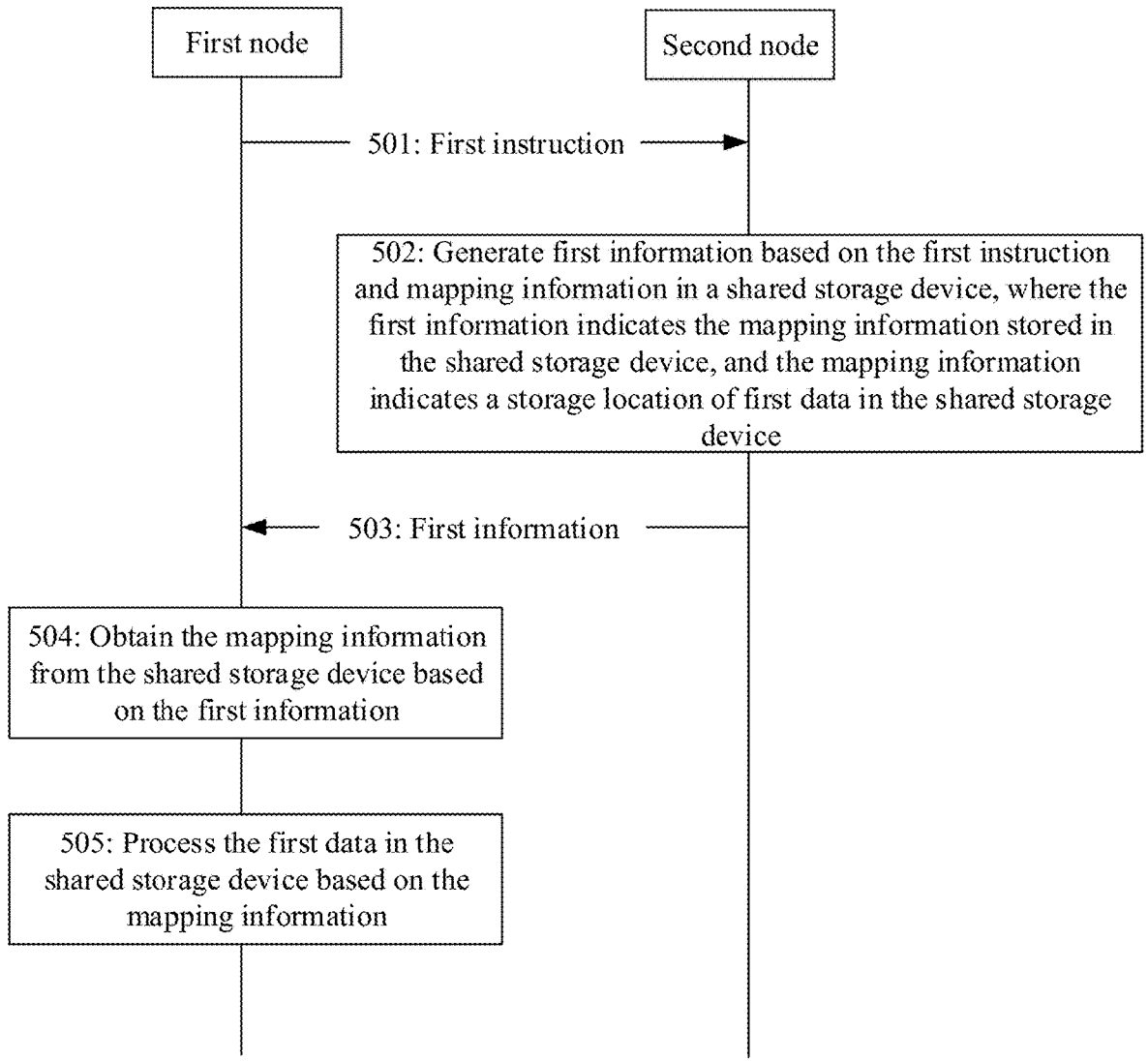
FIG. 5 is a schematic flowchart of a database system update method 500 according to an embodiment of this application.

FIG. 5 is a schematic flowchart of a database system update method 500 according to an embodiment of this application. The database system update method 500 is applied to a database system including a first node, a second node, and a shared storage device. The shared storage device is configured to store data. Both the first node and the second node are connected to the shared storage device, and are respectively configured to process different data in the shared storage device. In other words, both the first node and the second node are data processing nodes.

As shown in FIG. 5, the database system update method 500 includes the following operation 501 to operation 503.

501: The first node sends a first instruction to the second node, where the first instruction is used to request storage location information of first data in the shared storage device, and the first data is data transferred by the second node to the first node for processing.

When the database system needs to be updated, the second node needs to transfer the first data that is in the shared storage device and that is originally responsibly processed by the second node to the first node for processing. Because the first data is not originally responsibly processed by the first node, and the first node does not have storage location information of the first data in the shared storage device, the first node sends the first instruction to the second node, to request to obtain the storage location information of the first data in the shared storage device. The first data may be some data in data stored in the shared storage device.

In an embodiment of the application, for a node in the database system, different nodes are responsible for processing different data in the shared storage device, so that the different nodes can simultaneously process the data in the shared storage device, and a data error caused by simultaneous processing of same data by the different nodes does not occur. Therefore, each node in the database system has only storage location information of data for which the node is responsible in the shared storage device, and does not have storage location information of data for which another node is responsible in the shared storage device.

In an embodiment, when the database system is scaled-out, the first node is a newly added node in the database system, and the second node is an original node in the database system. To ensure load balancing between nodes in the database system, the second node transfers some data for which the second node is responsible to the first node for responsibility. When the database system is scaled-out, the first data may be some data in data for which the second node is responsible.

In an embodiment, when the database system is scaled-in, both the first node and the second node are original nodes in the database system, and the second node is a to-be-deleted node in the database system. Therefore, the second node needs to transfer the data responsibly processed by the second node to another node in the database system for processing. When the database system is scaled-in, the first data may be some or all of the data for which the second node is responsible. In other words, the second node may transfer all of the data for which the second node is responsible to the first node for processing. Alternatively, the second node may transfer some of the data for which the second node is responsible to the first node for processing, and transfer the other part of the data for which the second node is responsible to another node other than the first node for processing.

In an embodiment, when the database system includes a coordinator node, the first node may send the first instruction to the coordinator node, and the coordinator node forwards the first instruction to the second node. For example, when one or more slices in the shared storage device need to be transferred to the first node for responsibility, the coordinator node may forward the first instruction to the second node based on that a node responsible for processing the one or more slices is the second node.

502: The second node generates first information based on the first instruction and mapping information in the shared storage device, where the first information indicates the mapping information stored in the shared storage device, and the mapping information indicates a storage location of the first data in the shared storage device.

In an embodiment, the shared storage device may store the mapping information, where the mapping information indicates the storage location of the first data in the shared storage device. For example, when the database is used to store order data, the mapping information indicates a storage location of order data of each zone in the shared storage device.

After the second node obtains the first instruction from the first node, the second node determines, in the shared storage device, the mapping information corresponding to the first data indicated in the first instruction, and generates the first information based on the storage location of the mapping information in the shared storage device.

503: The second node sends the first information to the first node.

Alternatively, the second node may send the first information to the first node through a network channel. Alternatively, the second node may first send the first information to the coordinator node, and the coordinator node forwards the first information to the first node.

504: The first node obtains the mapping information from the shared storage device based on the first information.

After the first node obtains the first information, the first node may determine the mapping information located in the shared storage device, so that the mapping information can be obtained from the shared storage device based on the first information. For example, the first node may obtain the mapping information in the shared storage device based on the first information, and cache the mapping information in local storage space. After obtaining the mapping information, the first node may process the data in the shared storage device based on the mapping information.

505: The first node processes the first data in the shared storage device based on the mapping information.

After obtaining the mapping information, the first node may process the data in the shared storage device based on the mapping information. For example, when the first node receives a data processing request from a user, the first node determines, based on the mapping information, a storage location that is of target data indicated in the data processing request and that is in the shared storage device, and processes the target data based on the data processing request.

In an embodiment, when the shared storage device in the database stores a large amount of data, a specification of the mapping information used to record the data storage location is usually large. Therefore, to save a storage resource of the first node, the mapping information may be stored in the shared storage device. When executing the data processing request, the first node may determine a storage location of to-be-processed data based on the mapping information in the shared storage device. Alternatively, when executing the data processing request, the first node may cache some or all content in the mapping information to the local storage space.

For example, after obtaining the first information indicating the storage location of the mapping information, the first node determines the storage location of the mapping information in the shared storage device based on the first information, and stores the mapping information in a first zone in the shared storage device, where the first zone is a zone that is in the shared storage device and that is used to store data related to the first node. The first node generates second information based on the first zone, where the second information indicates a storage location of the mapping information. The second information may be stored in the first node. In a process of executing the data processing request, the first node may first determine the storage location (that is, the first zone) of the mapping information in the shared storage device based on the second information, and then query the mapping information in the first zone, to determine the storage location of the data corresponding to the data processing request in the shared storage device, thereby implementing data processing.

In short, after the first node determines, based on the first information, the mapping information stored in the shared storage device by the second node, the first node may copy the mapping information to the first zone, so that data processing can be performed based on the mapping information in the first zone.

In an embodiment, a plurality of data processing nodes in the database system share a same storage device, and the plurality of data processing nodes are respectively configured to process different data in the shared storage device. When a computing resource of the database system is updated, data that is responsibly processed by the second node needs to be transferred to the first node for processing, and the second node sends indication information to the first node, so that the first node obtains, from the shared storage device, the mapping information that records the data storage location, and processes, based on the obtained mapping information, some data that is in the shared storage device and that is transferred to the first node for processing. Different nodes share a same storage device, and the different nodes process different data based on corresponding mapping information. When the computing resource of the database system is updated, a large amount of data does not need to be migrated between nodes, but only the mapping information used to record the data storage location is migrated, so as to improve update efficiency of the database system, and ensure that the different nodes can simultaneously process the different data in the shared storage device.

In a possible embodiment, because the specification of the mapping information in the shared storage device is large, time required by the first node to synchronize the mapping information to the first zone and time required by the first node to synchronize the mapping information to the local storage space are usually long. To avoid that a database service is suspended for a long time in the process of synchronizing the mapping information by the first node, in an embodiment, the second node may execute the database service at the same time in the process of synchronizing the mapping information by the first node. After completing synchronization of the mapping information, the first node suspends the database service, and the first node obtains information about updating of the mapping information by the second node during synchronization of the mapping information.

For example, in a period in which the first node obtains the mapping information and stores the mapping information in the first zone, the second node may continue to provide a normal database service based on the mapping information cached by the second node, that is, the second node processes the data processing request initiated by the client. In a period in which the second node processes the data processing request, because the data in the shared storage device changes, the mapping information indicating the storage location of the data in the shared storage device actually also needs to be correspondingly updated. Therefore, the second node may generate an incremental log based on the data processing request, and stores the incremental log in the shared storage device, where the data processing request is used to request to update the first data in the shared storage device, and the incremental log is used to record update information of the first data.

In an embodiment, after the first node successfully stores the mapping information in the first zone or the local storage space of the first node based on the first information, the first node obtains the incremental log from the shared storage device, where the incremental log is generated by the second node in a period in which the first node obtains the mapping information, and the incremental log is used to record data update information in the shared storage device. Then, the first node updates, based on the incremental log, the mapping information stored in the first zone or the local storage space of the first node.

For example, it is assumed that before the second node generates the incremental log, the mapping information indicates that order data of a zone A is located in a slice 1 in the shared storage device and order data of a zone B is located in a slice 2 in the shared storage device. In a period in which the first node synchronizes the mapping information, the second node receives a data processing request, where the data processing request is used to request to store order data of a zone C in the slice 2. In this case, when the second node performs corresponding data processing based on the data processing request, the second node generates the incremental log, where the incremental log is used to record the order data of the storage zone C in the slice 2 in the shared storage device.

After the first node completes synchronization of the mapping information, that is, the first node stores the mapping information in the first zone, the first node obtains the incremental log from the shared storage device, where the incremental log is generated by the second node in a period in which the first node obtains a second mapping table. Then, the first node updates the mapping information based on the incremental log.

For example, when the mapping information stored by the first node in the first zone indicates that the order data of the zone A is located in the slice 1 in the shared storage device, the order data of the zone B is located in the slice 2 in the shared storage device, and the incremental log is used to record the order data of the zone C stored in the slice 2 in the shared storage device, the first node may update the mapping information, so that the mapping information indicates that the slice 2 stores both the order data of the zone B and the order data of the zone C.

In an embodiment, after the first node completes synchronization of the mapping information, the first node may trigger locking of a structure of the database and a table structure in the database. In other words, another node is not allowed to update the mapping information in the database or generate the incremental log. In this way, after triggering locking of the structure of the database and the table structure in the database, the first node may obtain latest mapping information in the database based on the obtained incremental log and the obtained mapping information.

For example, after the first node obtains the mapping information from the shared storage device based on the first information, the first node sends a second instruction to the second node, where the second instruction instructs the second node to delete mapping information related to the first data from the second node. In this way, after the second node receives the second instruction, the second node deletes the mapping information related to the first data in the second node based on the second instruction. In this case, when the second node deletes the mapping information related to the first data, and the first node successfully obtains the mapping information of the first data, it is ensured that only the first node is responsible for processing the first data in the shared storage device subsequently, thereby avoiding that a plurality of nodes simultaneously process same data.

In an embodiment, the first node first synchronizes the generated mapping information, and then the first node obtains the incremental log generated during synchronization of the mapping information, so that the database service is avoided to be suspended during synchronization of the mapping information by the first node, but is suspended only for a short time in which the first node obtains the incremental log, thereby greatly reducing suspension time of the database service and ensuring normal execution of the database service.

In a possible embodiment, when the shared storage device includes a plurality of slices, and the plurality of slices are respectively used to store different data, the mapping information may include two different mapping tables. One mapping table in the mapping information indicates a slice in the shared storage device in which data is stored, and the other mapping table indicates a storage address of the data in the slice.

For example, the mapping information may include a first mapping table and a second mapping table. The first mapping table indicates a target slice in which the first data is stored in the shared storage device, and the second mapping table indicates a storage location of the first data in the target slice, that is, the second mapping table indicates a storage address of the first data in the slice. For example, the first mapping table may be used to indicate that the order data of the zone A is located in the slice 1 in the shared storage device and the order data of the zone B is located in the slice 2 in the shared storage device. The second mapping table may be used to indicate a storage address of order data of the zone A in the slice 2 at XX hour XX minutes on XX month XX day.

For example, a structure of the first mapping table may be shown in Table 1.

TABLE 1

| Data identifier | Slice |
|---|---|
| 0001xxxx to 0099xxxx | Slice 1 |
| 0100xxxx to 0199xxxx | Slice 2 |
| 0200xxxx to 0299xxxx | Slice 3 |

As shown in Table 1, each piece of data in the shared storage device may be represented by an 8-bit data identifier, and different data has different data identifiers. The first mapping table can determine, based on first four bits in the data identifier, a slice in which the data is located in the shared storage device. For example, for data whose first four bits of the data identifier are 0001 to 0099, it may be determined, based on the first mapping table 1, that the data is located in the slice 1 in the shared storage device, without a need to care about last four bits of the data. Similarly, data whose first four bits of the data identifier are 0100 to 0199 is located in the slice 2, and data whose first four bits of the data identifier are 0200 to 0299 is located in the slice 3.

For example, a structure of the second mapping table may be shown in Table 2.

TABLE 2

| Data identifier | Specific address in a slice |
|---|---|
| 00010000 | Slice 1, 0x0001 |
| 00010001 | Slice 1, 0x0002 |
| 00010002 | Slice 1, 0x0003 |
| ... | ... |

As shown in Table 2, the second mapping table includes a correspondence between the data identifier and the address in the slice. Based on any data identifier, an address of data corresponding to the data identifier in a slice can be determined.

When the mapping information includes the two different mapping tables, the first node may first synchronize the first mapping table, and then synchronize the second mapping table.

Figure 6:
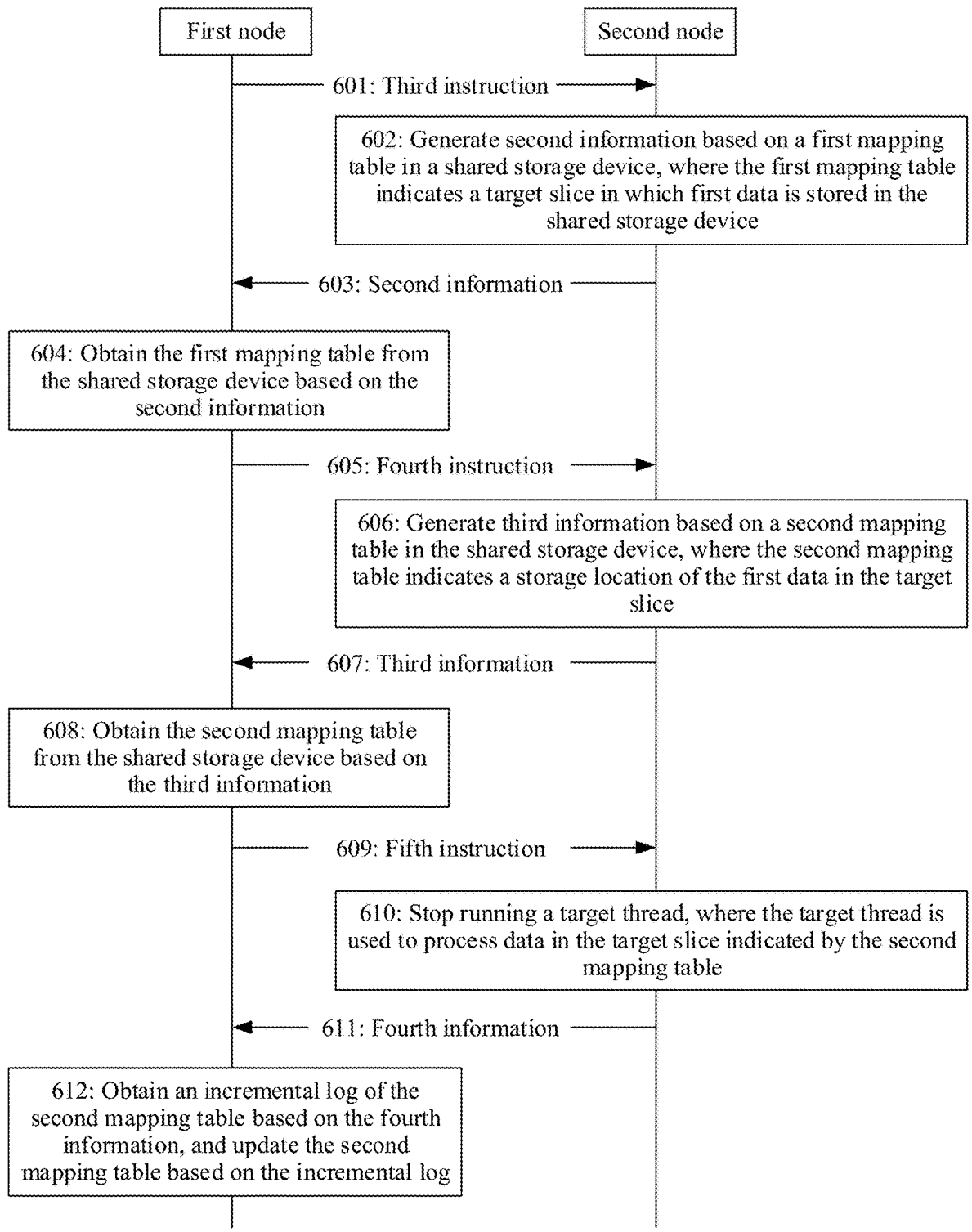
FIG. 6 is a schematic flowchart of a database system update method 600 according to an embodiment of this application.

For example, FIG. 6 is a schematic flowchart of a database system update method 600 according to an embodiment of this application. As shown in FIG. 6, the method 600 further includes the following operations 601 to 612.

Operation 601: A first node sends a third instruction to a second node, where the third instruction is used to request a slice in which first data is stored in a shared storage device.

The first data is data transferred by the second node to the first node for processing.

Operation 602: The second node generates second information based on a first mapping table in the shared storage device, where the second information indicates storage location information of the first mapping table in the shared storage device, and the first mapping table indicates a target slice in which the first data is stored in the shared storage device.

Operation 603: The second node sends the second information to the first node.

Operation 604: The first node obtains the first mapping table from the shared storage device based on the second information.

In addition, after the first node obtains the first mapping table, the first node may further obtain an incremental log corresponding to the first mapping table, to update the first mapping table based on the incremental log corresponding to the first mapping table. The incremental log corresponding to the first mapping table is generated by the second node when the first node obtains the first mapping table.

Operation 605: The first node sends a fourth instruction to the second node, where the fourth instruction is used to request a storage location of the first data in the target slice.

The first node may send the fourth instruction to the second node through a network channel. Alternatively, the first node may first send the fourth instruction to a coordinator node, and the coordinator node forwards the fourth instruction to the second node.

In an embodiment, when some of a plurality of slices for which the second node is responsible need to be transferred to the first node for responsibility, the first node may carry identifiers of the some of the plurality of slices on the fourth instruction, to instruct the second node to feed back mapping table information corresponding to the some slices. For example, when the second node is responsible for processing data of a slice 1, a slice 2, a slice 3, and a slice 4 in the shared storage device, after the first node is newly added to the database, the slice 1 and the slice 2 for which the second node is originally responsible need to be transferred to the first node for responsibility. Therefore, the first node may carry identifiers of the slice 1 and the slice 2 on the fourth instruction sent to the second node, to instruct the second node to feed back mapping table information corresponding to the slice 1 and the slice 2.

Operation 606: The second node generates third information based on the second mapping table in the shared storage device.

The third information indicates the second mapping table stored in the shared storage device, and the second mapping table indicates a storage location of the first data in the target slice in the shared storage device. In a process of performing data processing, the second node is configured to process the data in the shared storage device based on the first mapping table and the second mapping table.

For example, it is assumed that a data processing request received by the second node is a request to read order data of a zone A at XX hour XX minutes on XX month XX day, the second node may determine, by querying the first mapping table, that the order data of the zone A is located in the slice 2 in the shared storage device, and then the second node determines, by querying the second mapping table corresponding to the slice 2, a storage address of the order data of the zone A at XX hour XX minutes on XX month XX day in the slice 2, to read corresponding data based on the storage address.

Operation 607: The second node sends the third information to the first node, so that the second node obtains the second mapping table.

The second node may send the third information to the first node through a network channel. Alternatively, the second node may first send the third information to a coordinator node, and the coordinator node forwards the third information to the first node.

Operation 608: The first node obtains the second mapping table from the shared storage device based on the third information.

In an embodiment, after the first node obtains the second mapping table from the shared storage device, the first node may store the second mapping table in a local storage space of the first node, so that the first node can quickly query, based on the second mapping table in the local storage space, a storage address of the data in the shared storage device.

Operation 609: The first node sends a fifth instruction to the second node, where the fifth instruction instructs the second node to stop updating the second mapping table.

After the first node successfully obtains the second mapping table based on the second information, the first node sends the fifth instruction to the second node, to instruct the second node to stop updating the second mapping table. In an embodiment, the fifth instruction may be, for example, a service interruption command or a service blocking command, and instructs the second node to interrupt a data processing request related to the second mapping table, to avoid modifying the second mapping table.

It may be understood that before the second node receives the fifth instruction, the second node normally executes the data processing request. When the second node executes the data processing request, the second node may update the data in the shared storage device based on the data processing request, thereby triggering to update the second mapping table.

In an embodiment, the second node may generate, based on the data processing request, an incremental log corresponding to the second mapping table, where the incremental log is used to record update information of the second mapping table. For example, when the second mapping table indicates the storage address of the order data of the zone A in the slice 2, it is assumed that the data processing request received by the second node is used to request to store order data of a zone B in the slice 2, the second node generates an incremental log during execution of the data processing request. The incremental log is used to indicate a storage address of the order data of the zone B in the slice 2.

Operation 610: The second node stops running a target thread, where the target thread is used to process data in the target slice indicated by the second mapping table.

After the second node receives the fifth instruction from the first node, the second node stops running the target thread, where the target thread is used to process the data in the target slice indicated by the second mapping table. For example, when the second mapping table indicates storage addresses of the data in the slice 1 and the slice 2, the target thread may be a thread configured to process data in the slice 1 and the slice 2, and the second node may kill the target thread configured to process the data in the slice 1 and the slice 2, to avoid continuing to update the second mapping table.

Operation 611: The second node sends fourth information to the first node, where the third information indicates a storage location of the incremental log corresponding to the second mapping table in the shared storage device, the incremental log corresponding to the second mapping table is generated by the second node in a period in which the first node obtains the second mapping table, and the incremental log corresponding to the second mapping table is used to record the update information of the second mapping table.

Operation 612: The first node obtains, based on the fourth information, the incremental log corresponding to the second mapping table, and updates the second mapping table based on the incremental log corresponding to the second mapping table.

After obtaining the fourth information from the second node, the first node obtains, based on the fourth information, the incremental log corresponding to the second mapping table in the shared storage device, and updates, based on the obtained incremental log corresponding to the second mapping table, the second mapping table stored in the local storage space.

In an embodiment, the second mapping table may include a plurality of slice mapping tables, and the plurality of slice mapping tables are respectively used to indicate storage locations of data in corresponding slices. In other words, each slice in the shared storage device has a corresponding slice mapping table, and the slice mapping table indicates a storage location of data in the slice. For example, the second mapping table includes a slice mapping table 1, a slice mapping table 2, and a slice mapping table 3, and the shared storage device includes a slice 1, a slice 2, and a slice 3. In this case, the slice mapping table 1 is used to indicate a storage location of data in the slice 1, the slice mapping table 2 is used to indicate a storage location of data in the slice 2, and the slice mapping table 3 is used to indicate a storage location of data in the slice 3.

In addition, the incremental log obtained by the first node includes a plurality of pieces of log data, where the plurality of pieces of log data respectively correspond to the plurality of slice mapping tables, and the plurality of pieces of log data are respectively used to record data update information on different slices. In other words, each piece of log data corresponds to one slice mapping table, and each slice mapping table in the plurality of slice mapping tables can be updated based on each piece of log data. In an embodiment, in a process of generating the incremental log, the second node may independently generate corresponding log data for each slice, so that the log data one-to-one corresponds to the slice mapping table.

In this solution, the log data corresponding to the slice mapping table is independently generated for each slice, so that in a process of updating the second mapping table based on the log data, the first node can simultaneously update the plurality of slice mapping tables based on the log data corresponding to all the slice mapping tables, thereby improving update efficiency of the second mapping table.

In an embodiment, after the first node completes updating of the second mapping table, the first node may send a mapping table update complete message to the second node, so that the second node resumes running of the foregoing target thread.

The foregoing describes the database system update method provided in embodiments of this application. For ease of understanding, the following describes the database system update method in detail with reference to an example.

Figure 7:
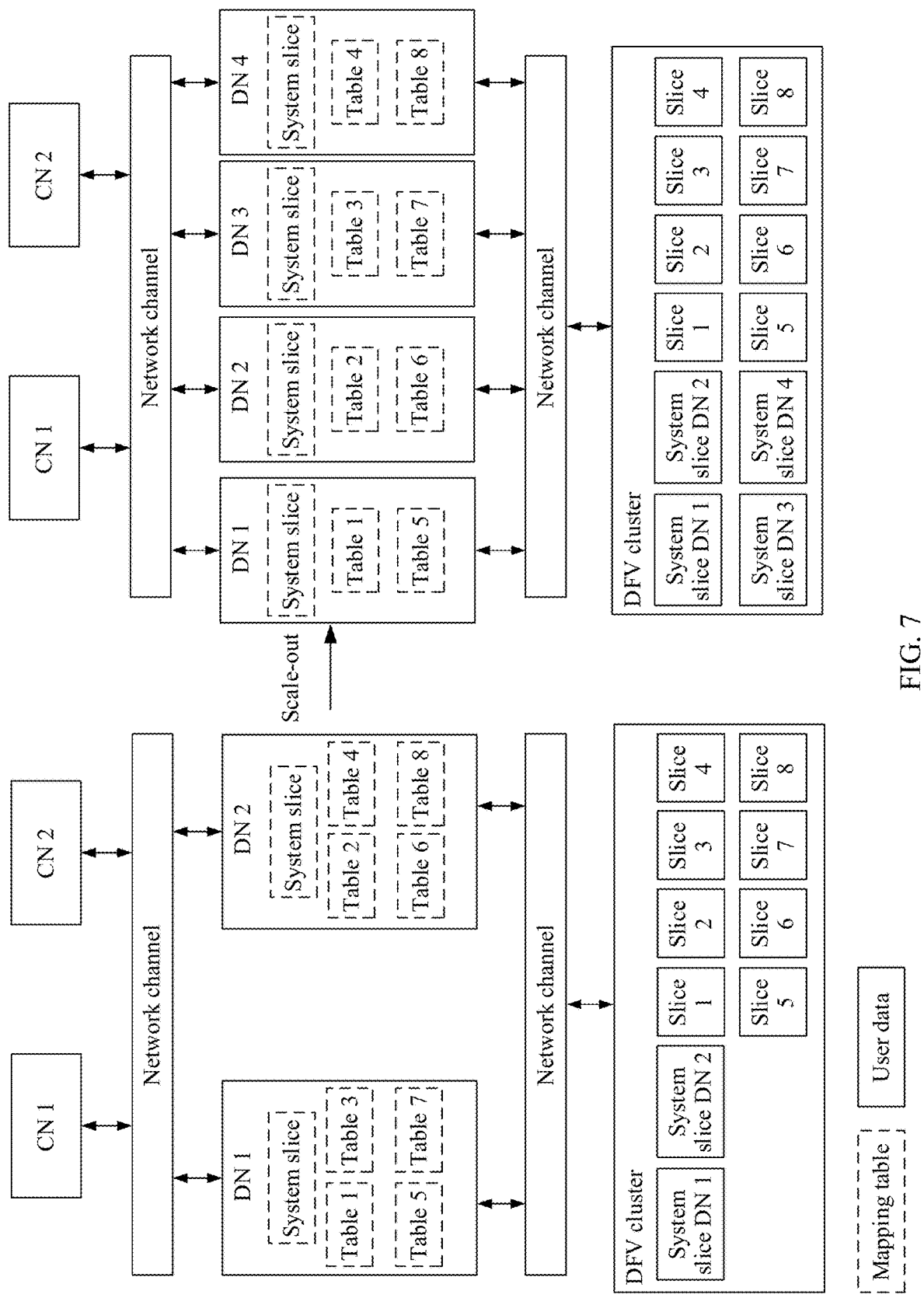
FIG. 7 is a diagram of database scale-out according to an embodiment of this application.

FIG. 7 is a diagram of database scale-out according to an embodiment of this application.

As shown in FIG. 7, before a database is scaled-out, the database includes a CN 1, a CN 2, a DN 1, a DN 2, and a DFV cluster. The CN 1 and the CN 2 are client access nodes, and are responsible for delivering SQL commands to the DN 1 and the DN 2, for example, delivering data processing requests. The DN 1 and the DN 2 are data processing nodes, and are responsible for processing the data processing requests delivered by the CN 1 and the CN 2. The DFV cluster is a shared storage device used to store actual user data. In the DFV cluster, data is managed by slice. Different data is stored in different slices.

In FIG. 7, the DFV cluster is divided into eight slices in total: a slice 1 to a slice 8. Each slice is used to store user data. In addition, the DFV cluster stores a system mapping table, and the system mapping table indicates a slice in which the data is stored in the DFV cluster, that is, the system mapping table may be, for example, the foregoing first mapping table. In an embodiment, a system slice DN 1 in the DFV cluster is a system mapping table 1 stored in the DFV cluster by the DN 1, and a system slice DN 2 in the DFV cluster is a system mapping table 2 stored in the DFV cluster by the DN 2. In addition, a system slice in the DN 1 is system mapping table information 1 stored in the DN 1, and the system mapping table information 1 indicates a storage location of the system mapping table 1 in the DFV cluster. A system slice in the DN 2 is system mapping table information 2 stored in the DN 2, and the system mapping table information 2 indicates a storage location of the system mapping table 2 in the DFV cluster.

Before the database is scaled-out, the DN 1 is responsible for processing data in the slice 1, the slice 3, the slice 5, and the slice 7, and the DN 2 is responsible for processing data in the slice 2, the slice 4, the slice 6, and the slice 8. The DN 1 and the DN 2 each store a mapping table related to a slice. In an embodiment, a table 1, a table 3, a table 5, and a table 7 stored in the DN 1 are respectively slice mapping tables corresponding to the slice 1, the slice 3, the slice 5, and the slice 7, and are respectively used to record storage addresses of the data in the slice 1, the slice 3, the slice 5, and the slice 7. In other words, the slice mapping table may be, for example, the foregoing second mapping table. A table 2, a table 4, a table 6, and a table 8 stored in the DN 2 are respectively slice mapping tables corresponding to the slice 2, the slice 4, the slice 6, and the slice 8, and are respectively used to record storage addresses of the data in the slice 2, the slice 4, the slice 6, and the slice 8.

After the database is scaled-out, a DN 3 and a DN 4 are newly added to the database. Therefore, the slices are evenly distributed among the three DNs: the DN 1, the DN 2, the DN 3, and the DN 4. In an embodiment, the slice 3 and the slice 7 that are originally responsibly processed by the DN 1 are transferred to the DN 3 for responsibility, and the slice 4 and the slice 8 that are originally responsibly processed by the DN 2 are transferred to the DN 4 for responsibility. As shown in FIG. 7, the DN 1 and the DN 3 are used as examples. After the database is scaled-out, the DN 3 obtains a system mapping table from the DN 1, and stores the system mapping table in the DFV cluster. A system slice DN 3 in the DFV cluster is a system mapping table 3 stored in the DFV cluster by the DN 3. In addition, the DN 3 generates system mapping table information based on a storage location of the system mapping table 3 in the DFV cluster, and stores the system mapping table information in local storage space. The DN 3 further obtains the table 3 and the table 7 from the DN 1, and stores the table 3 and the table 7 in the local storage space. The DN 1 deletes the table 3 and the table 7 from local storage space.

The system mapping table stored in the DFV cluster mainly stores metadata such as an object identifier (OID) of the table, to record the slice in which the data is stored in the DFV cluster. Similarly, the DFV cluster further stores a mapping table (not shown in FIG. 7) used to record a storage address of the data in the slice, for example, mapping tables such as the table 1 and the table 2 stored in the DNs in FIG. 7.

Figure 8:
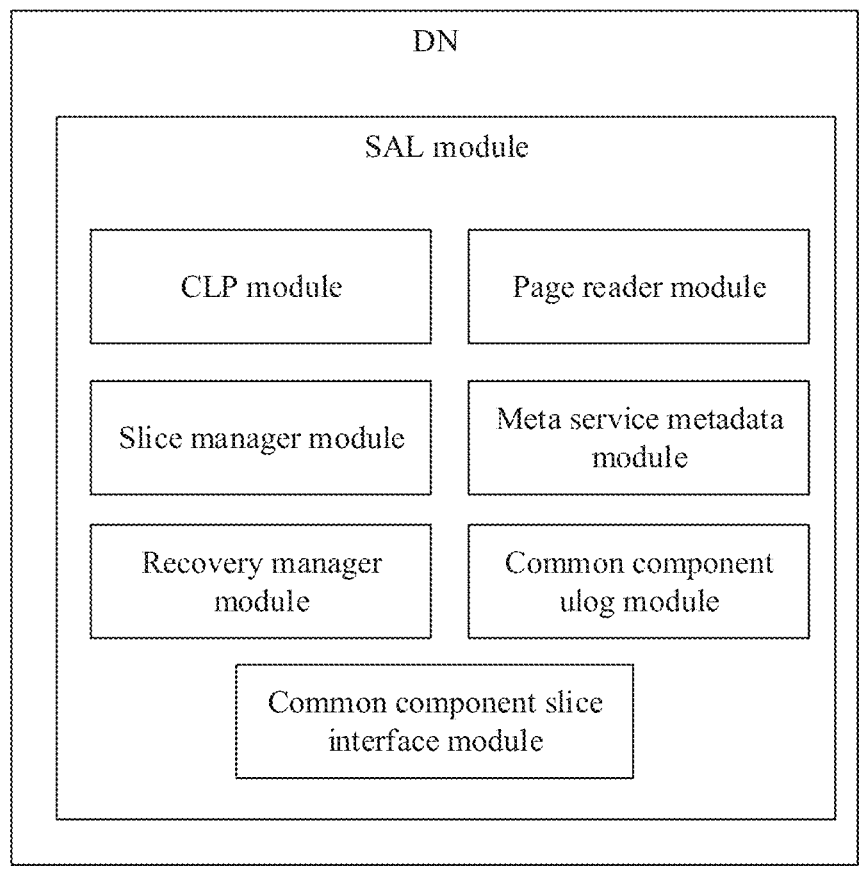
FIG. 8 is a diagram of a structure of a DN according to an embodiment of this application.

FIG. 8 is a diagram of a structure of a DN according to an embodiment of this application. As shown in FIG. 8, in an embodiment, a storage abstraction layer (SAL) module is newly added to the DN. The SAL module includes metadata, does not include data, and is responsible for computing a command. The following separately describes other modules included in the SAL module.

Common log processor (CLP) module: provides XLog-related abstract interfaces, such as log write and read interfaces and a persistent log sequence number (LSN) interface.

Page reader (Page Reader) module: provides a read interface of a data file.

Slice manager (slice Manager) module: is responsible for managing a mapping rule of a slice and implements mapping from a log to the slice and mapping from a physical page to the slice. Generally, a slice in a storage device includes one or more slices, and the slice includes one or more pages.

Meta service metadata module: manages data persistence and reading of the SAL module.

Recovery manager module: provides an abnormal power-off recovery capability.

Common component ULog module: encapsulates a PLog write interface in a DFV cluster and provides abstract append semantics.

Common component slice interface module: encapsulates a slice interface of a DFV cluster and provides abstract slice semantics.

For ease of description, the following describes in detail the database system update method by using the foregoing DN 1 and DN 3 as examples.

Figure 9:
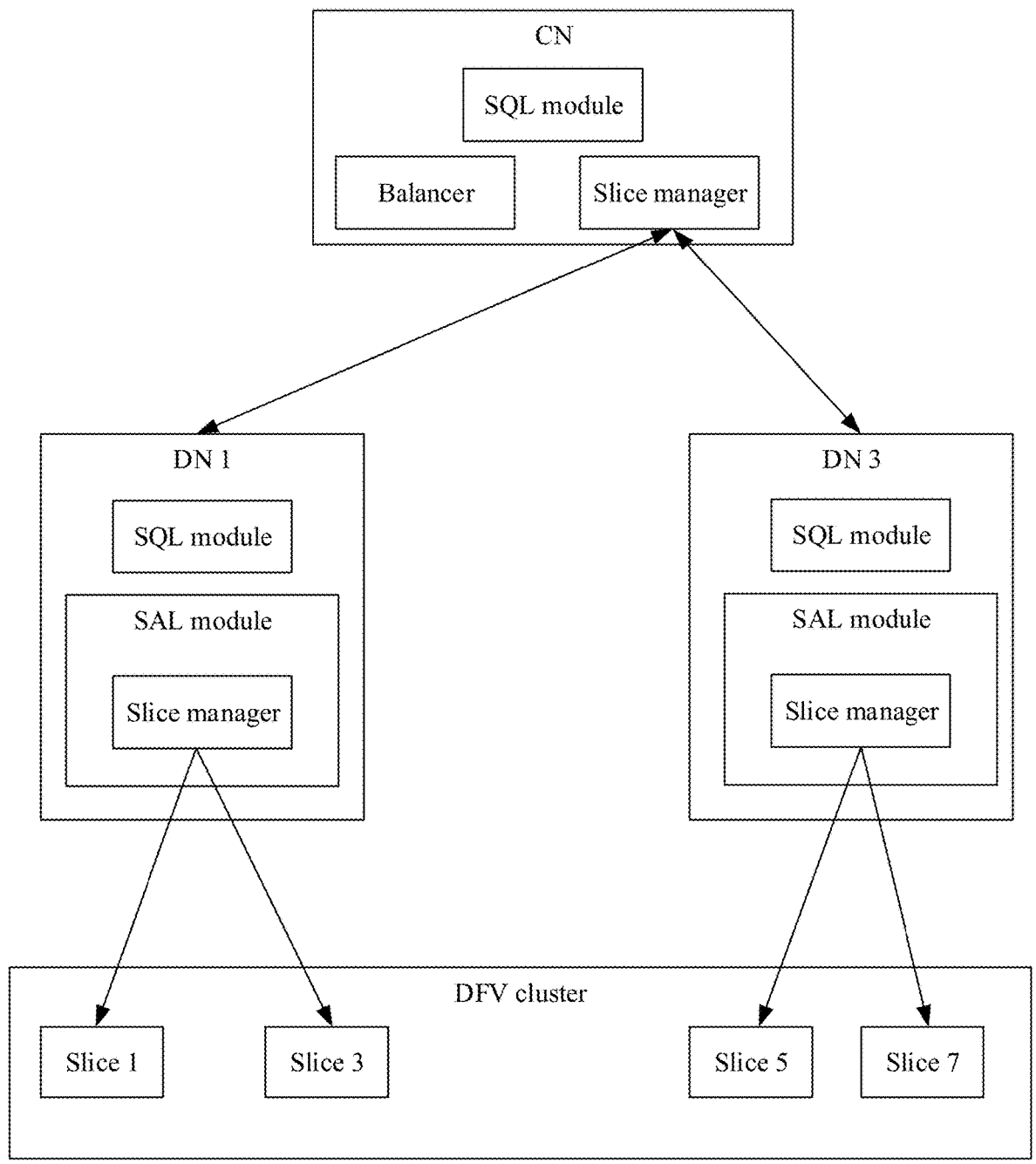
FIG. 9 is a diagram of a component architecture of a database according to an embodiment of this application.

FIG. 9 is a diagram of a component architecture of a database according to an embodiment of this application. As shown in FIG. 9, a CN includes an SQL module, a balancer, and a slice manager. The SQL module is configured to: obtain a data processing request (SQL command) of a client, parse the data processing request, determine a DN used to process the data processing request, and deliver the data processing request to the corresponding DN. The balancer is configured to evenly distribute, when the database is scaled-out, partitions for which an original DN is responsible to newly added DNs, so that slices for which all the DNs are responsible are even. The slice manager is configured to determine, based on a parsing result of the data processing request, a DN used to process the data processing request.

The DN includes an SQL module and an SAL module. The SQL module in the DN is configured to parse an SQL command delivered by the CN, to perform a corresponding data processing operation. The SAL module includes a slice manager, and is configured to: perform a corresponding data processing operation based on an indication of the data processing request, and update a corresponding system mapping table or slice mapping table.

In an embodiment, when the database is scaled-out, a process for updating the database mainly includes four phases: system mapping table synchronization, incremental log synchronization of a system mapping table, slice mapping table synchronization, and incremental data synchronization of a slice mapping table. The following uses an example in which the DN 3 is a newly added node and the DN 1 is a source node to describe in detail each phase in the process for updating the database.

Phase 1: System Mapping Table Synchronization

Figure 10:
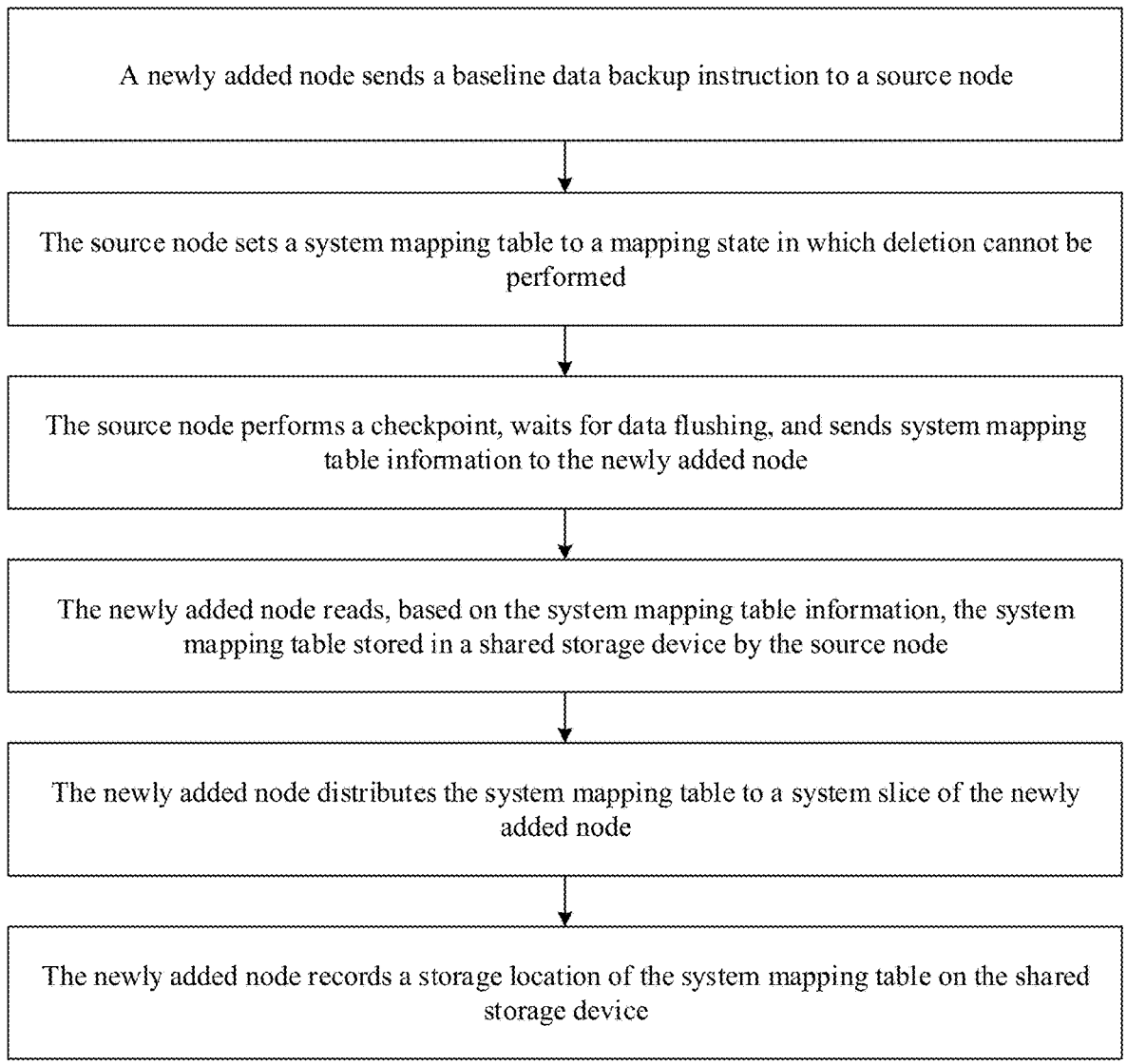
FIG. 10 is a schematic flowchart of system mapping table synchronization according to an embodiment of this application.

FIG. 10 is a schematic flowchart of system mapping table synchronization according to an embodiment of this application. As shown in FIG. 10, after the newly added node is added to the database, the newly added node sends a baseline data backup instruction to the source node, where the baseline data backup instruction instructs the source node to feed back baseline data of a system mapping table to the newly added node. The newly added node may directly send the baseline data backup instruction to the source node through a network channel. Alternatively, the newly added node may first send the baseline data backup instruction to a coordinator node, and then the coordinator node forwards the baseline data backup instruction to the source node.

After obtaining the baseline data backup instruction, the source node sets the system mapping table to a mapping state in which deletion cannot be performed, that is, an object that has been created in the system mapping table cannot be deleted.

Then, the source node performs a checkpoint, to obtain version information of the current system mapping table, that is, obtain a version to which the current system mapping table is updated. Generally, the source node may generate a related log to update the system mapping table. Therefore, the source node may obtain a log number corresponding to the current system mapping table, to obtain the version information of the system mapping table. After the source node obtains the version information of the current system mapping table, the source node stores and backs up the system mapping table in the shared storage device, and sends system mapping table information to the newly added node after data of the system mapping table is flushed to a disk (that is, the system mapping table is successfully backed up in the shared storage device). The system mapping table information may be the version information of the current system mapping table, for example, may be the log number corresponding to the current system mapping table. In addition, the system mapping table information may further indicate a storage location of the system mapping table corresponding to the source node in the shared storage device. For example, the system mapping table information may be an identifier of storage space in the shared storage device, and storage space that is in the shared storage device and that is used to store the system mapping table can be determined based on the identifier. For another example, the system mapping table information may directly indicate a storage address of the system mapping table in the shared storage device.

After obtaining the system mapping table information from the source node, the newly added node may read, based on the system mapping table information, the system mapping table stored in the shared storage device by the source node. For example, after the newly added node obtains the log number corresponding to the system mapping table, the newly added node may determine, based on the log number, a system mapping table updated based on a log whose number is before the log number, to obtain the system mapping table stored in the shared storage device by the source node. For another example, the newly added node reads, in the shared storage device based on the storage address indicated by the system mapping table information, the system mapping table corresponding to the storage address.

The newly added node distributes the system mapping table to a system slice of the newly added node, that is, stores the system mapping table in a zone corresponding to the newly added node in the shared storage device, so that the newly added node can query and manage the system mapping table subsequently.

Finally, the newly added node may record a storage location of the system mapping table in the shared storage device, and generate related system mapping table information. The system mapping table information is stored in local storage space of the newly added node, so that the newly added node can query the system mapping table in the shared storage device based on the system mapping table information.

Phase 2: Incremental Log Synchronization of a System Mapping Table

Figure 11:
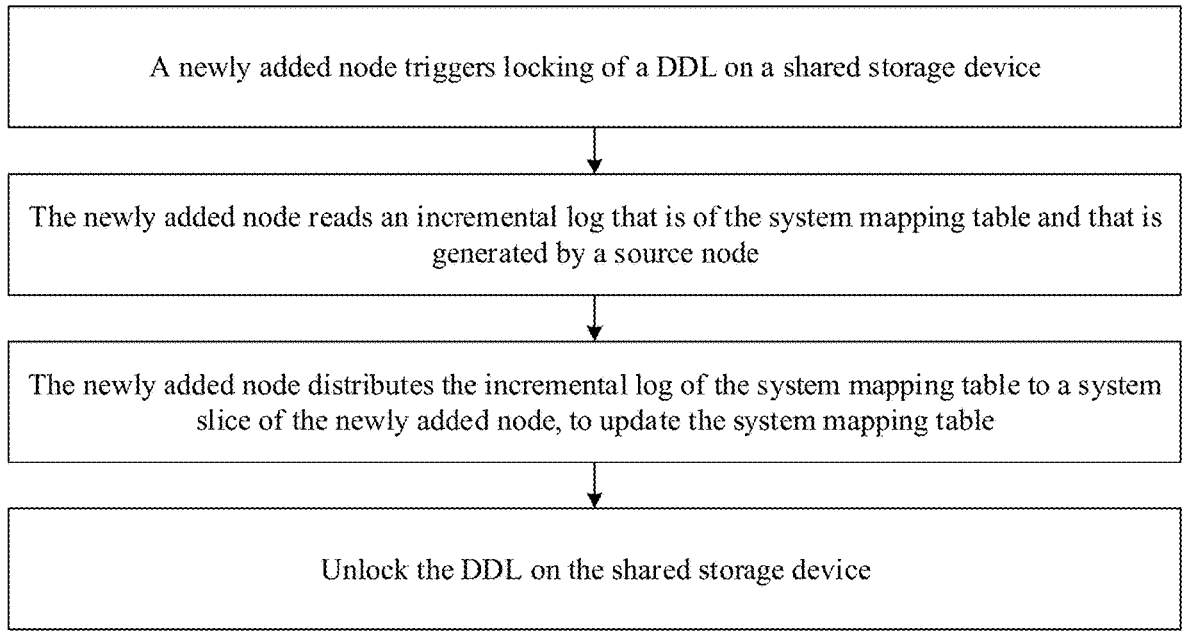
FIG. 11 is a schematic flowchart of incremental log synchronization of a system mapping table according to an embodiment of this application.

FIG. 11 is a schematic flowchart of incremental log synchronization of a system mapping table according to an embodiment of this application. As shown in FIG. 11, after completing system mapping table synchronization, the newly added node triggers locking of a data definition language (DDL) on the shared storage device, that is, adds DDL locking to an object in the database, so as not to create or modify various objects in the database. In this way, the source node cannot create or modify the objects in the database, and no new logs related to the system mapping table are generated. In an embodiment, the newly added node may send a DDL locking instruction to a CN, and the CN notifies all nodes of the instruction, to trigger locking of the DDL, so that the all nodes do not create or modify the various objects in the database.

Then, the newly added node reads an incremental log that is of the system mapping table and that is generated by the source node, where the incremental log is generated by the source node when the newly added node synchronizes the system mapping table, and indicates update information of the system mapping table.

The newly added node distributes the obtained incremental log of the system mapping table to a system slice of the newly added node, to update the system mapping table. After the system mapping table is updated, the new node triggers unlocking of the DDL on the shared storage device to ensure that the database service runs normally.

Phase 3: Slice Mapping Table Synchronization

Figure 12:
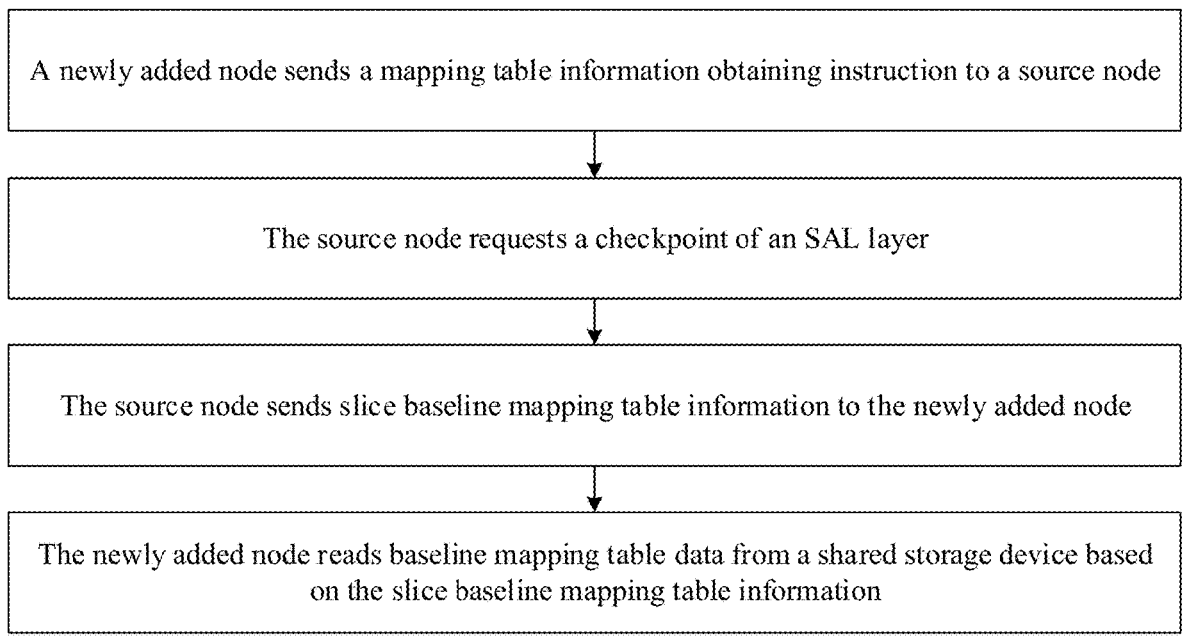
FIG. 12 is a schematic flowchart of slice mapping table synchronization according to an embodiment of this application.

FIG. 12 is a schematic flowchart of slice mapping table synchronization according to an embodiment of this application. As shown in FIG. 12, after completing updating of the system mapping table, the newly added node sends a mapping table information obtaining instruction to the source node, to request to obtain a slice mapping table.

After obtaining the mapping table information instruction, the source node requests a checkpoint of an SAL layer, that is, backs up the current slice mapping table to the shared storage device. The slice mapping table indicates a storage address of data in a slice. Then, the source node sends slice baseline mapping table information to the newly added node, where the slice baseline mapping table information indicates the slice mapping table stored in the shared storage device.

Finally, the newly added node may read mapping table baseline data from the shared storage device based on the slice baseline mapping table information, and store the mapping table baseline data in local storage space of the newly added node, to quickly query the slice mapping table.

Phase 4: Incremental Data Synchronization of a Slice Mapping Table

Figure 13:
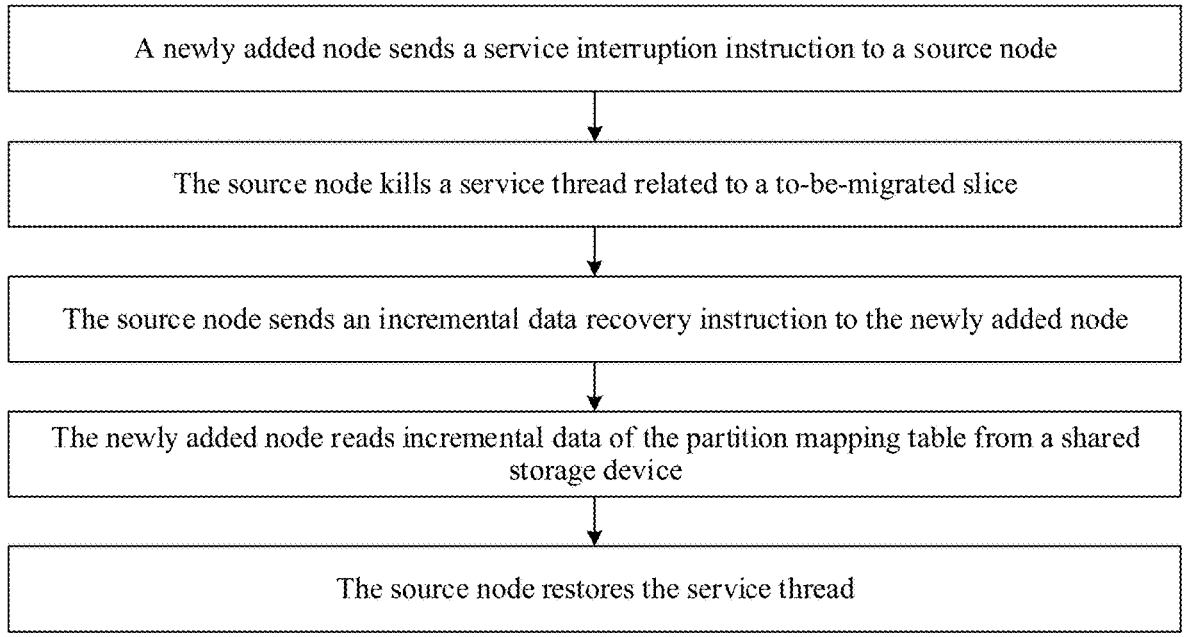
FIG. 13 is a schematic flowchart of incremental data synchronization of a slice mapping table according to an embodiment of this application.

FIG. 13 is a schematic flowchart of incremental data synchronization of a slice mapping table according to an embodiment of this application. As shown in FIG. 13, after completing synchronization of the baseline data of the slice mapping table, the newly added node sends a service interruption instruction to the source node, to instruct the source node to interrupt execution of a corresponding database service, so as to prevent the source node from continuing to update the slice mapping table.

After obtaining the service interruption instruction, the source node kills a service thread related to a to-be-migrated slice, to prevent the service thread from continuing to update a corresponding slice mapping table.

Then, the source node sends an incremental data recovery instruction to the newly added node, to instruct the newly added node to read incremental data of the slice mapping table. The incremental data of the slice mapping table is data that is obtained through updating by the source node during synchronization of the slice mapping table by the newly added node.

The newly added node reads the incremental data of the slice mapping table from the shared storage device, and updates the slice mapping table based on the incremental data of the slice mapping table, to obtain a slice mapping table of a latest version.

Finally, after the newly added node completes incremental data synchronization of the slice mapping table, the newly added node notifies the source node, so that the source node restores the service thread, thereby ensuring normal running of the database service.

In an embodiment, when the database is scaled-in, a process for updating the database mainly includes two processes: mapping table baseline data migration and mapping table incremental data migration. The following uses an example in which a to-be-deleted node is a node that needs to be deleted in the database, and a target node is a node that is in the database and that is responsible for replacing the to-be-deleted node, to describe in detail each process in the database scale-in process.

Process 1: Mapping Table Baseline Data Migration

Figure 14:
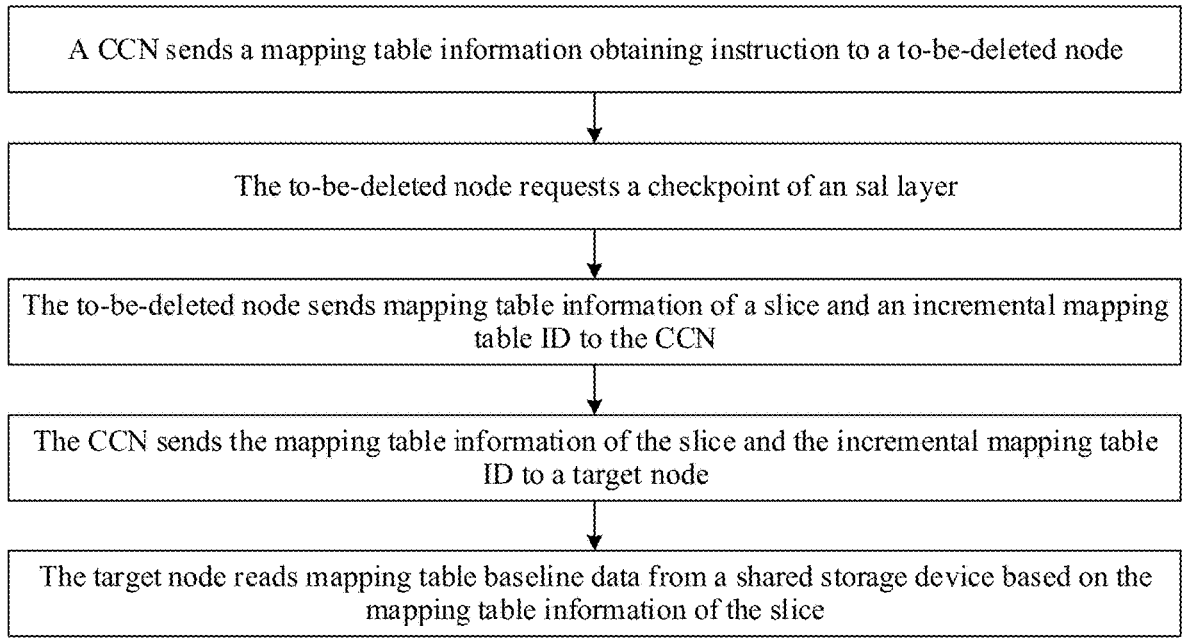
FIG. 14 is a schematic flowchart of mapping table baseline data migration according to an embodiment of this application.

FIG. 14 is a schematic flowchart of mapping table baseline data migration according to an embodiment of this application. As shown in FIG. 14, when a present node in the database is determined to be deleted, a CCN is responsible for re-assigning a slice for which the to-be-deleted node is responsible to another node. In an embodiment, in an embodiment, the CCN is responsible for re-assigning the slice for which the to-be-deleted node is responsible to a target node, so that a slice mapping table on the to-be-deleted node needs to be migrated to the target node.

First, the CNN sends a mapping table information obtaining instruction to the to-be-deleted node, where the mapping table information obtaining instruction instructs the to-be-deleted node to feed back related information of the slice mapping table.

Then, the to-be-deleted node requests a checkpoint of an SAL layer, that is, backs up the current slice mapping table to the shared storage device. The slice mapping table indicates a storage address of data in a slice. Then, the to-be-deleted node sends mapping table information of the slice to the CCN, where the mapping table information of the slice indicates the slice mapping table stored in the shared storage device. In an embodiment, the to-be-deleted node may further send an incremental mapping table ID to the CCN at the same time, so that a subsequent target node can quickly obtain incremental mapping table data. The incremental mapping table ID is used to uniquely identify an incremental mapping table corresponding to the to-be-deleted node, and the to-be-deleted node records update information of the slice mapping table into the incremental mapping table during synchronization of the slice mapping table by the target node.

After obtaining the mapping table information of the slice and the incremental mapping table ID that are sent by the to-be-deleted node, the CCN sends the mapping table information of the slice and the incremental mapping table ID to the target node.

Finally, the target node may read mapping table baseline data from the shared storage device based on the mapping table information of the slice, and store the mapping table baseline data in a storage area that is in the shared storage device and that is related to the newly added node. In addition, the newly added node may also store the mapping table baseline data in local storage space, so as to quickly query the slice mapping table.

Process 2: Mapping Table Incremental Data Migration

Figure 15:
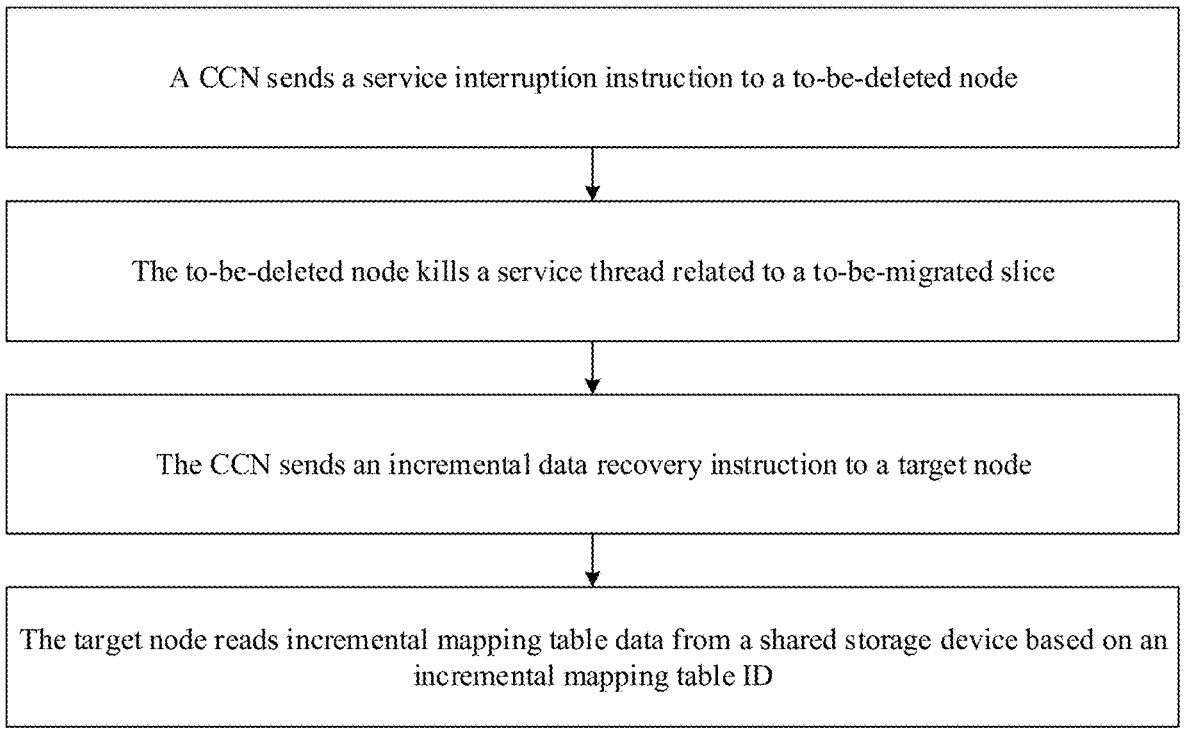
FIG. 15 is a schematic flowchart of mapping table incremental data migration according to an embodiment of this application.

FIG. 15 is a schematic flowchart of mapping table incremental data migration according to an embodiment of this application. As shown in FIG. 15, after the target node completes synchronization of the baseline data of the slice mapping table, a CCN sends a service interruption instruction to a to-be-deleted node. After obtaining the service interruption instruction, the to-be-deleted node kills a service thread related to a to-be-migrated slice.

Then, the CCN sends an incremental data recovery instruction to the target node, to instruct the target node to read incremental data of a corresponding slice mapping table. When obtaining the incremental data recovery instruction, the target node reads incremental mapping table data from the shared storage device based on a pre-received incremental mapping table ID, and updates the slice mapping table based on the incremental data of the slice mapping table, obtain a slice mapping table of a latest version.

Finally, after the target node completes incremental data synchronization of the slice mapping table, the to-be-deleted node may be deleted from the database, to complete database scale-in.

The foregoing describes procedures of database scale-out and scale-in with reference to accompanying drawings. For ease of understanding beneficial effect brought by the database system update method provided in an embodiment, an embodiment provides a test result related to database scale-out. Table 3 is a diagram of a test of database scale-out provided in an embodiment.

TABLE 3

| Data amount | Number of nodes | Concurrency | CPU pressure | Node addition | Redistribution | Maximum service interruption duration of a single DN |
|---|---|---|---|---|---|---|
| 3000 | Scale out3 to 6 | 200 | 40-50% | 5 minutes and 24 seconds | 1 minute | 207 ms |
| 3000 | Scale out 3 to 9 | 200 | 40-50% | 5 minutes and 51 seconds | 1 minute | 219 ms |

It can be learned from Table 3 that, when the database system update method provided in an embodiment is used, in a process of scaling out the database, in a scenario of 3000 data amounts, when three nodes are scaled-out to six nodes and three nodes are scaled-out to nine nodes, service interruption duration of a single node is up to 219 milliseconds. In this solution, time required by database scale-out can be shortened to a second level, and time during which the database is impacted can be shortened to a millisecond level.

Based on embodiments corresponding to FIG. 1 to FIG. 15, to better implement the foregoing solutions in embodiments of this application, the following further provides related devices configured to implement the foregoing solutions.

Figure 16:
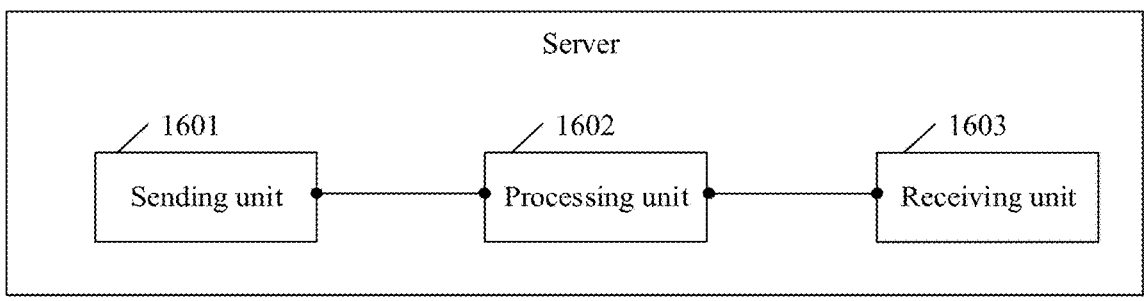
FIG. 16 is a diagram of a structure of a server according to an embodiment of this application.

FIG. 16 is a diagram of a structure of a server according to an embodiment of this application. The server is a first node in a database. A database system includes a first node, a second node, and a shared storage device. The shared storage device is configured to store data. The first node and the second node are respectively configured to process different data in the shared storage device. The server includes: a sending unit 1601, configured to send a first instruction to the second node, where the first instruction is used to request storage location information of first data in the shared storage device, and the first data is data transferred by the second node to the first node for processing; a receiving unit 1603, configured to obtain first information sent by the second node, where the first information indicates mapping information stored in the shared storage device, and the mapping information indicates a storage location of the first data in the shared storage device; and a processing unit 1602, configured to obtain the mapping information from the shared storage device based on the first information. The processing unit 1602 is further configured to process the first data in the shared storage device based on the mapping information.

In an embodiment, the first node is a newly added node in the database system.

In an embodiment, the second node is a to-be-deleted node in the database system.

In an embodiment, the shared storage device includes a plurality of slices, the plurality of slices are respectively used to store different data, the mapping information includes a first mapping table and a second mapping table, the first mapping table indicates a target slice in which the first data is stored in the shared storage device, and the second mapping table indicates a storage location of the first data in the target slice.

In an embodiment, the processing unit 1602 is further configured to: obtain an incremental log from the shared storage device, where the incremental log is generated by the second node in a period in which the first node obtains the mapping information, and the incremental log is used to record data update information in the shared storage device; and update the mapping information based on the incremental log.

In an embodiment, the shared storage device includes the plurality of slices, the plurality of slices are respectively used to store the different data, the incremental log includes a plurality of pieces of log data, and the plurality of pieces of log data are respectively used to record data update information on different slices.

In an embodiment, the processing unit 1602 is further configured to: store the mapping information in a first zone in the shared storage device, where the first zone is a zone that is in the shared storage device and that is used to store data related to the first node; and generate second information based on the first zone, where the second information indicates a storage location of the mapping information.

In an embodiment, the sending unit 1601 is further configured to send a second instruction to the second node, where the second instruction instructs the second node to delete mapping information related to the first data from the second node.

In another embodiment, the server is a second node in a database. A database system includes a first node, a second node, and a shared storage device. The shared storage device is configured to store data. The first node and the second node are respectively configured to process different data in the shared storage device. The server includes: a receiving unit 1603, configured to obtain a first instruction sent by the first node, where the first instruction is used to request storage location information of first data in the shared storage device, and the first data is data transferred by the second node to the first node for processing; a processing unit 1602, configured to generate first information based on the first instruction and mapping information in the shared storage device, where the first information indicates the mapping information stored in the shared storage device, and the mapping information indicates a storage location of the first data in the shared storage device; and a sending unit 1601, configured to send the first information to the first node, so that the second node obtains the mapping information.

In an embodiment, the first node is a newly added node in the database system.

In an embodiment, the second node is a to-be-deleted node in the database system.

In an embodiment, the shared storage device includes a plurality of slices, the plurality of slices are respectively used to store different data, the mapping information includes a first mapping table and a second mapping table, the first mapping table indicates a target slice in which the first data is stored in the shared storage device, and the second mapping table indicates a storage location of the first data in the target slice.

In an embodiment, the processing unit 1602 is further configured to: generate an incremental log based on a data processing request, and store the incremental log in the shared storage device, where the data processing request is used to request to update the first data, and the incremental log is used to record update information of the first data.

In an embodiment, the shared storage device includes the plurality of slices, the plurality of slices are respectively used to store the different data, the incremental log includes a plurality of pieces of log data, and the plurality of pieces of log data are respectively used to record data update information on different slices.

In an embodiment, the receiving unit 1603 is further configured to receive a second instruction sent by the first node, where the second instruction instructs the second node to delete mapping information related to the first data from the second node. The processing unit 1602 is further configured to delete the mapping information related to the first data in the second node based on the second instruction.

An embodiment of this application further provides a computer program product. When the computer program product runs on a computer, the computer is enabled to perform operations performed by the foregoing execution device, or the computer is enabled to perform operations performed by the foregoing training device.

An embodiment of this application further provides a computer-readable storage medium. The computer-readable storage medium stores a program used to process a signal, and when the program is run on a computer, the computer is enabled to perform operations performed by the foregoing execution device; or the computer is enabled to perform operations performed by the foregoing training device.

The execution device or the terminal device that is provided in embodiments of this application may be a chip. The chip includes a processing unit and a communication unit. The processing unit may be, for example, a processor, and the communication unit may be, for example, an input/output interface, a pin, or a circuit. The processing unit may execute computer-executable instructions stored in a storage unit, so that the chip in the execution device is enabled to perform the compilation method described in the foregoing embodiment. In an embodiment, the storage unit is a storage unit in the chip, for example, a register or a buffer. Alternatively, the storage unit may be a storage unit in a wireless access device but outside the chip, for example, a read-only memory (ROM), another type of static storage device that can store static information and instructions, or a random access memory (RAM).

It may be clearly understood by one of ordinary skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) to perform all or some of the operations of the methods described in embodiments of this application. The foregoing storage medium includes: any medium that can store program code, such as a USB flash disk, a removable hard disk, a read-only memory, a random access memory, a magnetic disk, or an optical disc.

What is claimed is:

1. A method for updating a database system, comprising:
    sending, by a first node, a first instruction to a second node, wherein the first instruction is used to request storage location information of first data in a shared storage device, and responsibility of processing the first data is transferred from the second node to the first node;
    obtaining, by the first node, first information sent by the second node, wherein the first information indicates mapping information stored in the shared storage device, and the mapping information indicates a storage location of the first data in the shared storage device;
    obtaining, by the first node, the mapping information from the shared storage device based on the first information; and
    processing, by the first node, the first data in the shared storage device based on the mapping information.

2. The method of claim 1, wherein the first node is a newly added node in the database system.

3. The method of claim 1, wherein the second node is a to-be-deleted node in the database system.

4. The method of claim 1, wherein the shared storage device comprises a plurality of slices respectively used to store different data, the mapping information comprises a first mapping table and a second mapping table, the first mapping table indicates a target slice in which the first data is stored in the shared storage device, and the second mapping table indicates a storage location of the first data in the target slice.

5. The method of claim 1, further comprising:
    obtaining, by the first node, an incremental log from the shared storage device, wherein the incremental log is generated by the second node in a period in which the first node obtains the mapping information, and the incremental log is used to record data update information in the shared storage device; and
    updating, by the first node, the mapping information based on the incremental log.

6. The method of claim 5, wherein the shared storage device comprises a plurality of slices respectively used to store different data, the incremental log comprises a plurality of pieces of log data respectively used to record data update information on different slices.

7. The method of claim 1, further comprising:
    storing, by the first node, the mapping information in a first zone in the shared storage device, wherein the first zone is in the shared storage device used to store data related to the first node; and
    generating, by the first node, second information based on the first zone, wherein the second information indicates a storage location of the mapping information.

8. The method of claim 1, wherein after the obtaining the mapping information from the shared storage device based on the first information, the method further comprises:
    sending, by the first node, a second instruction to the second node, wherein the second instruction instructs the second node to delete mapping information related to the first data from the second node.

9. A first node, comprising:
    a memory and a processor, wherein the memory stores instructions, which when executed by the processor, cause the processor to:

send a first instruction to a second node, wherein the first instruction is used to request storage location information of first data in a shared storage device, and responsibility of processing the first data is transferred from the second node to the first node;

obtain first information sent by the second node, wherein the first information indicates mapping information stored in the shared storage device, and the mapping information indicates a storage location of the first data in the shared storage device;

obtain the mapping information from the shared storage device based on the first information; and process the first data in the shared storage device based on the mapping information.

10. The first node of claim 9, wherein the first node is a newly added node in a database system.

11. The first node of claim 9, wherein the second node is a to-be-deleted node in a database system.

12. The first node of claim 9, wherein the shared storage device comprises a plurality of slices, the plurality of slices are respectively used to store different data, the mapping information comprises a first mapping table and a second mapping table, the first mapping table indicates a target slice in which the first data is stored in the shared storage device, and the second mapping table indicates a storage location of the first data in the target slice.

13. The first node of claim 9, wherein the instructions, when executed, further cause the processor to:

obtain an incremental log from the shared storage device, wherein the incremental log is generated by the second node in a period in which the first node obtains the mapping information, and the incremental log is used to record data update information in the shared storage device; and update the mapping information based on the incremental log.

14. The first node of claim 13, wherein the shared storage device comprises a plurality of slices, the plurality of slices are respectively used to store different data, the incremental log comprises a plurality of pieces of log data, and the plurality of pieces of log data are respectively used to record data update information on different slices.

15. The first node of claim 9, wherein the instructions, when executed, further cause the processor to:

store the mapping information in a first zone in the shared storage device, wherein the first zone is a zone that is in the shared storage device and that is used to store data related to the first node; and generate second information based on the first zone, wherein the second information indicates a storage location of the mapping information.

16. The first node of claim 9, wherein the instructions, when executed, method further cause the processor to:

send a second instruction to the second node, wherein the second instruction instructs the second node to delete mapping information related to the first data from the second node.

17. A non-transitory machine-readable storage medium storing instructions, which when executed by a first node, the first node is enabled to:

send a first instruction to a second node, wherein the first instruction is used to request storage location information of first data in a shared storage device, and responsibility of processing the first data is transferred from the second node to the first node;

obtain first information sent by the second node, wherein the first information indicates mapping information stored in the shared storage device, and the mapping information indicates a storage location of the first data in the shared storage device;

obtain the mapping information from the shared storage device based on the first information; and process the first data in the shared storage device based on the mapping information.

18. The non-transitory machine-readable storage medium of claim 17, wherein the first node is a newly added node in a database system.

19. The non-transitory machine-readable storage medium of claim 17, wherein the second node is a to-be-deleted node in a database system.

20. The non-transitory machine-readable storage medium of claim 17, wherein the shared storage device comprises a plurality of slices respectively used to store different data, the mapping information comprises a first mapping table and a second mapping table, the first mapping table indicates a target slice in which the first data is stored in the shared storage device, and the second mapping table indicates a storage location of the first data in the target slice.

* * * * *